US012754932B2

(12) United States Patent
Safary et al.

(10) Patent No.: US 12,754,932 B2
(45) Date of Patent: *Oct. 6, 2026

(54) ARTIFICIAL INTELLIGENCE (AI)-BASED BLOCKCHAIN MANAGEMENT

(71) Applicant: Bank of America Corporation, Charlotte, NC (US)

(72) Inventors: Jigesh Rajendra Safary, Mumbai (IN); Krishna Rangarao Mamadapur, Pune (IN)

(73) Assignee: Bank of America Corporation, Charlotte, NC (US)

( * ) Notice: Subject to any disclaimer, the term of this patent is extended or adjusted under 35 U.S.C. 154(b) by 1341 days.

This patent is subject to a terminal disclaimer.

(21) Appl. No.: 17/217,637

(22) Filed: Mar. 30, 2021

(65) Prior Publication Data

US 2022/0318270 A1 Oct. 6, 2022

(51) Int. Cl.
*G06F 16/28* (2019.01)
*G06F 16/23* (2019.01)

(52) U.S. Cl.
CPC .......... *G06F 16/28* (2019.01); *G06F 16/2379* (2019.01)

(58) Field of Classification Search
CPC ............................. G06F 16/28; G06F 16/2379
See application file for complete search history.

(56) References Cited

U.S. PATENT DOCUMENTS

| | | | | |
|---|---|---|---|---|
| 10,402,792 | B2 | 9/2019 | Lin et al. | |
| 10,600,009 | B1 * | 3/2020 | Augustine | G06Q 30/0215 |
| 10,659,219 | B1 | 5/2020 | Ganeshmani et al. | |
| 10,678,597 | B2 | 6/2020 | Wang | |
| 10,726,000 | B1 | 7/2020 | Fortney | |
| 10,841,213 | B2 * | 11/2020 | Chen | H04L 45/44 |
| 11,108,627 | B2 * | 8/2021 | Smith | H04L 67/1046 |
| 11,188,977 | B2 * | 11/2021 | Youb | G06F 21/64 |
| 11,240,301 | B2 * | 2/2022 | Kaddoura | A61F 2/447 |
| 11,282,137 | B2 * | 3/2022 | McDonald | G06Q 20/204 |
| 11,544,102 | B2 * | 1/2023 | Lee | G06F 16/2379 |
| 11,636,425 | B2 * | 4/2023 | Kirkegaard | H04L 63/0428 705/50 |
| 12,013,813 | B2 * | 6/2024 | Winarski | H04L 9/3297 |

(Continued)

OTHER PUBLICATIONS

Fridgen, et al.; Implementation of a Blockchain Workflow Management Prototype; Discussion Paper; https://www.comidor.com/blog/blockchain-technology/blockchain-business-process-management; Fraunhofer Project Group Business & Information Sytems Engineering; 4 pages; (2017);; Norddeutsche Landesbank, Hannover, Germany.

(Continued)

*Primary Examiner* — Miranda Le
(74) *Attorney, Agent, or Firm* — Banner & Witcoff, Ltd.

(57) ABSTRACT

Aspects of this disclosure relate to artificial intelligence (AI)-assisted creation of a blockchain by a decentralized network. Various aspects of this disclosure relate to AI-based determination of blockchain parameters for use in workflow management processes. However, the AI-based approaches described herein are applicable for any blockchain-based procedures. Blockchain parameters, such as a block size, may be determined based on one or more parameters associated with the decentralized network (e.g., input/output load, network bandwidth, etc.).

18 Claims, 12 Drawing Sheets

(56) References Cited

U.S. PATENT DOCUMENTS

| | | | | |
|---|---|---|---|---|
| 2002/0087712 | A1* | 7/2002 | Awasthi | H04L 47/29 709/233 |
| 2018/0039667 | A1 | 2/2018 | Pierce et al. | |
| 2018/0268162 | A1 | 9/2018 | Dillenberger | |
| 2018/0294955 | A1 | 10/2018 | Rhie et al. | |
| 2019/0012249 | A1 | 1/2019 | Mercuri et al. | |
| 2019/0018887 | A1* | 1/2019 | Madisetti | H04L 9/3247 |
| 2019/0042989 | A1 | 2/2019 | Scott | |
| 2019/0123889 | A1 | 4/2019 | Schmidt-Karaca | |
| 2019/0236598 | A1 | 8/2019 | Padmanabhan | |
| 2019/0318350 | A1* | 10/2019 | Hinkel | H04L 9/3247 |
| 2019/0354518 | A1* | 11/2019 | Zochowski | G06F 16/2379 |
| 2020/0027162 | A1 | 1/2020 | Singh et al. | |
| 2020/0028688 | A1* | 1/2020 | Takada | H04L 9/3247 |
| 2020/0143469 | A1* | 5/2020 | Stewart | H04L 9/0637 |
| 2020/0162324 | A1* | 5/2020 | Amburey | H04L 41/0816 |
| 2020/0177373 | A1* | 6/2020 | Komandur | H04L 9/3247 |
| 2020/0252147 | A1* | 8/2020 | Jana | H04B 17/373 |
| 2020/0372163 | A1 | 11/2020 | Chung | |
| 2021/0073291 | A1* | 3/2021 | Hunter | G06F 8/65 |
| 2021/0092035 | A1* | 3/2021 | Williams | H04L 47/22 |
| 2021/0258142 | A1 | 8/2021 | Ishigaya et al. | |
| 2021/0294920 | A1* | 9/2021 | Sachs | G06F 21/10 |
| 2022/0198304 | A1 | 6/2022 | Szczepanik et al. | |

OTHER PUBLICATIONS

Fridgen et al; Cross-Organizational Workflow Management Using Blockchain Technology—Towards Applicability, Auditability, and Automation; article; 10 pages; Proceedings of the 51st Hawaii International Conference on System Science; 2018.

Everman, et al.; Workow Management on the Blockchain | Implications and Recommendations; (<https://www.researchgate.net/publication/332169042_Workflow_Management_on_the_Blockchain_-_Implications_and_Recommendations>); 27 pages; Mar. 31, 2019; Memorial University of Newfoundland, St. John's, Canada.

Pattanayak, et al.; "Blockchain Technology: Beyond Bitcoin." Applied Innovation 2: article; Jun. 2016; 16 pages; Sutardja Center for Entrepreneurship & Technology; Berkeley Engineering.

Dolgui et al.; Blockchain-oriented dynamic modelling of smart contract design and execution in the supply chain article; https://doi.org/10.1080/00207543.2019.1627439; International Journal of Production Research, Jun. 12, 2019; 17 pages.

* cited by examiner

ARTIFICIAL INTELLIGENCE (AI)-BASED BLOCKCHAIN MANAGEMENT

TECHNICAL FIELD

Aspects of the disclosure relate to blockchain management, and more specifically, to artificial intelligence (AI)-based management of blockchain parameters.

BACKGROUND

Blockchain-based technologies have seen increasing use for a wide range of applications. Secure, immutable, and distributed storage of information, and decentralized validation are some of the aspects that have led to increasing adoption of these technologies across a range of application areas. The most widespread and visible application of blockchains is in the domain of crypto-currency. However, the technology may be used for any application where decentralized and distributed operation is desirable.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various issues associated with management of blockchain systems. One or more of the aspects herein relate to AI-based techniques for blockchain management. One or more of the aspects herein are described with reference to use of blockchains for workflow management systems, but may be applicable for any blockchain-based technologies.

In accordance with one or more arrangements, a method for dynamic new block creation may comprise receiving, at a workflow engine and from a user computing device comprising a graphical user interface module, a first worklist item, and validating, at the workflow engine, the first worklist item. The method may further comprise adding the first worklist item to a data store communicatively coupled with a plurality of user computing devices, wherein the data store comprises a plurality of worklist items including the first worklist item; comparing, by a computer processor, a size of the plurality of worklist items to a threshold size; and determining, by the computer processor, that the size meets the threshold size. The threshold size may be dynamic. The method may further comprise, in response to the determining that the size meets the threshold size, generating a hash value corresponding to the plurality of worklist items in the data store; creating a new block using the generated hash value and an immediately preceding block hash in the blockchain; and transmitting the new block for addition to the blockchain. The method may further comprise updating the workflow engine with the blockchain, wherein the workflow engine comprises activity names and identifiers corresponding to the plurality of worklist items.

In some arrangements, the threshold size may be dynamic based on: monitoring an input and output (I/O) load of the data store; monitoring a network bandwidth corresponding to the data store; and increasing the threshold size when the I/O load is high and the network bandwidth is high. A high network bandwidth may comprise values in an upper quartile of a range of network bandwidths over a historical time period. A high I/O load may comprise values in a higher quartile of a range of I/O loads over a historical time period.

In some arrangements, the monitoring the I/O load of the data store may comprise monitoring at least one of: an average size of the data store; an arrival rate of worklist items to the data store; an average wait time for a worklist item in the data store; and combinations thereof.

In some arrangements, the monitoring the network bandwidth of the data store may comprise monitoring at least one of: an average data transfer rate to the data store; an average packet transfer rate to the data store; and combination thereof.

In some arrangements, the threshold size may be dynamic based on: monitoring an input and output (I/O) load of the data store; increasing the threshold size when the I/O load is high. The method may further comprise decreasing the threshold size when the I/O load is low. A low I/O may comprise values in a lower quartile of a range of I/O loads over a historical time period.

In some arrangements, the threshold size may be dynamic based on: monitoring a network bandwidth corresponding to the data store; and decreasing the threshold size when the network bandwidth is low. The method may further comprise decreasing the threshold size when the network bandwidth is low. A low network bandwidth may comprise values in a lower quartile of a range of network bandwidths over a historical time period.

In some arrangements, the method may further comprise allocating an award to a first blockchain node, of a plurality of blockchain nodes associated with the plurality of user computing devices, in response to adding of the new block to the blockchain. The creating the new block may comprise adding a time stamp to the block. The time stamp may indicate a time of creation of the new block.

In some arrangements, the first worklist item may comprise: an indication of the user computing device; and one or more worklist tasks associated with a workflow. In some arrangements, the first worklist item may comprise updated information associated with a worklist task stored in a previous block of the blockchain.

In some arrangements, the validating the first worklist item may comprise determining whether the user computing device is authorized to send the first worklist item.

In accordance with one or more arrangements, a system may comprise: a user computing device, an ordering service server, a computer processor, and a workflow engine. The user computing device may comprise a graphical user interface (GUI) module configured to receive an input indicating first worklist item. The ordering service server may be communicatively coupled to a plurality of user computing devices including the user computing device. The ordering service server may be configured to: receive, from the user computing device, the first worklist item; and add the first worklist item to a data store, wherein the data store comprises a plurality of worklist items including the first worklist item. The computer processor may be configured to: compare a size of the plurality of worklist items to a threshold size; determine that the size meets the threshold size; in response to the determining that the size meets the threshold size, generating a hash value corresponding to the plurality of worklist items in the data store. The threshold size may be dynamic. The computer processor may be configured to: create a new block using the generated hash value and an immediately preceding block hash in a blockchain; and transmit the new block for addition to the blockchain. The workflow engine may be configured to: receive, from the ordering service server, the first worklist item; validate the first worklist item; and update, based on the new block, worklists associated with the plurality of user computing devices.

In accordance with one or more arrangements, a method for artificial intelligence (AI)-assisted creation of new blocks in a blockchain may comprise adding a first worklist item to a data store communicatively coupled with a plurality of computing devices. The data store may comprise a plurality of worklist items including the first worklist item. The method may further comprise, monitoring, by an AI engine, an input and output (I/O) load of the data store, and a network bandwidth corresponding to the data store. The AI engine may compare a size of the plurality of worklist items to a threshold size. The threshold size may be increased when the I/O load is high and the network bandwidth is high. The threshold size may be decreased when the I/O load is low and the network bandwidth is low. The method may further comprise determining that the size meets the threshold size and, in response to the determining that the size meets the threshold size, generating a hash value corresponding to the plurality of worklist items in the data store. The method may further comprise creating a new block using the generated hash value and an immediately preceding block hash in the blockchain; and adding the new block to the blockchain.

In some arrangements, the new block may comprise a nonce value that, when hashed with a digest that combines the generated hash value and an immediately preceding block hash in the blockchain, generates a second hash value that comprises a predetermined number of consecutive alphanumerical characters at a predetermined position.

In some arrangements, the monitoring the I/O load of the data store may comprise monitoring at least one of: an average size of the data store; an arrival rate of worklist items to the data store; an average wait time for a worklist item in the data store; and combinations thereof.

In some arrangements, the monitoring the network bandwidth of the data store may comprise monitoring at least one of: an average data transfer rate to the data store; an average packet transfer rate to the data store; and combination thereof.

In some arrangements, the increasing the threshold size when the I/O load is high may comprise increasing the threshold size when the I/O load is within a higher quartile of a range of I/O loads over a historical time period. In some arrangements, the increasing the threshold size when the I/O load is high may comprise increasing the threshold size when an arrival rate of worklist items to the data store is greater than a threshold rate.

In some arrangements, the decreasing the threshold size when the I/O load is low may comprise decreasing the threshold size when an average wait time for a worklist item in the data store is greater than a threshold wait time. In some arrangements, the decreasing the threshold size when the I/O load is low may comprise decreasing the threshold size when an arrival rate of worklist items to the data store is lower than a threshold rate.

In some arrangements, the creating the new block may comprise adding a time stamp to the block, wherein the time stamp may indicate a time of creation of the new block.

In some arrangements, the first worklist item may comprise one or more worklist tasks associated with a workflow. In some arrangements, the method may further comprise adding a second worklist item to the data store, wherein the second worklist item indicates completion of a first worklist task of the one or more worklist tasks. In some arrangements, the one or more worklist tasks may comprise a second worklist task, wherein the second worklist task comprises a smart contract, and wherein a script associated with the smart contract is executed based on the completion of the first worklist task.

In some arrangements, the first worklist item may comprise updated information associated with a worklist task stored in a previous block of the blockchain. In some arrangements, the validating the first worklist item may comprise determining whether the user computing device is authorized to send the first worklist item.

In accordance with one or more arrangements, a system may comprise an ordering service server communicatively coupled to a plurality of user computing devices, an AI engine, and a computer processor. The ordering service server may be configured to add a first worklist item to a data store, wherein the data store comprises a plurality of worklist items including the first worklist item. The AI engine may be configured to: monitor an input and output (I/O) load of the data store; monitor a network bandwidth corresponding to the data store; and compare a size of the plurality of worklist items to a threshold size. The threshold size may be increased when the I/O load is high and the network bandwidth is high, and decreased when the I/O load is low and the network bandwidth is low. The computer processor may be configured to: determine that the size meets the threshold size; in response to the determining that the size meets the threshold size, generate a hash value corresponding to the plurality of worklist items in the data store; create a new block using the generated hash value and an immediately preceding block hash in a blockchain; and send the new block for addition to the blockchain.

These features, along with many others, are discussed in greater detail below.

DETAILED DESCRIPTION

Figure 1:
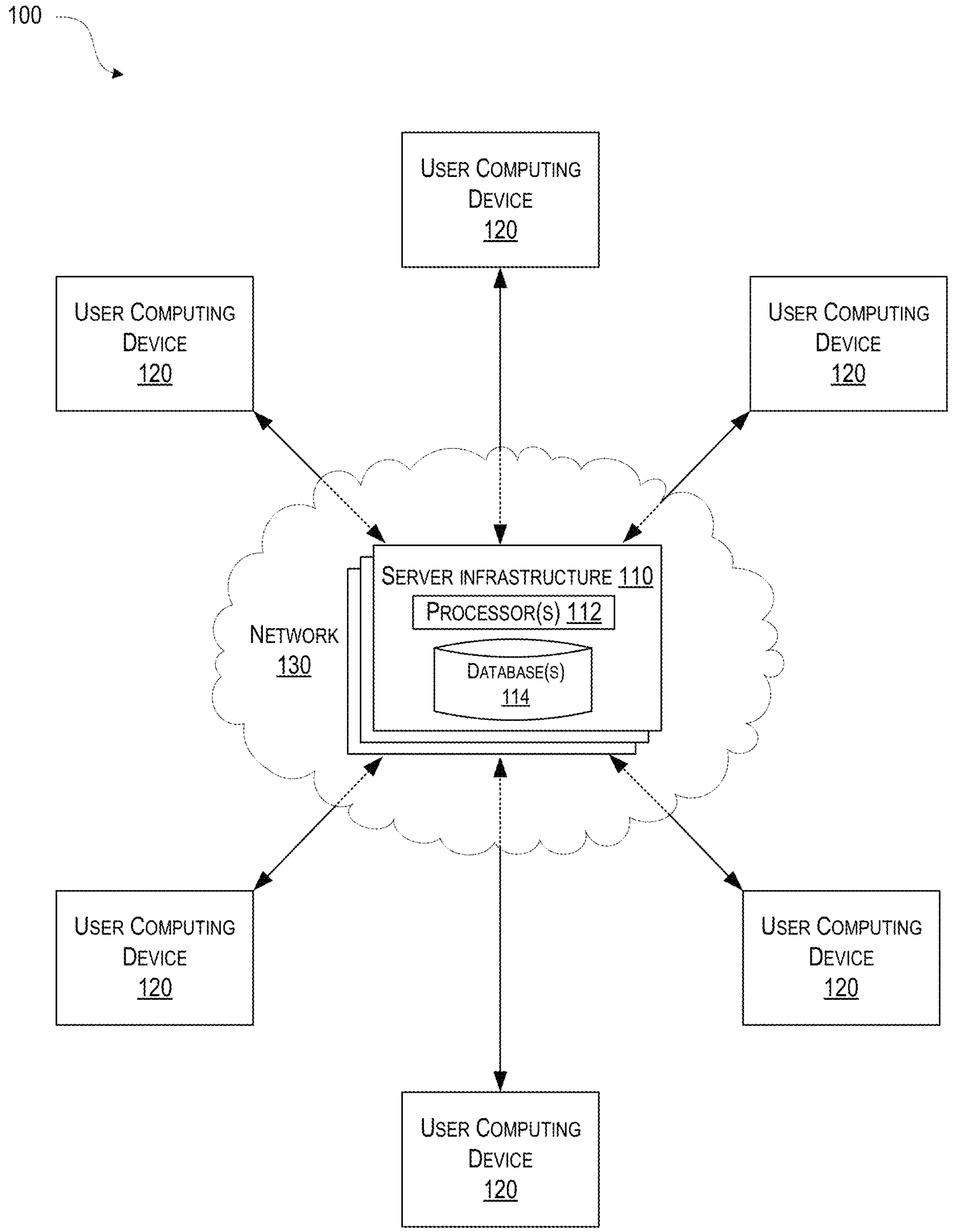
FIG. 1 depicts an illustrative example of centralized computer system in accordance with one or more illustrative aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect. The examples and arrangements described are merely some example arrangements in which the systems described herein may be used. Various other arrangements employing aspects described herein may be used without departing from the invention.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations. The computing devices forming the decentralized P2P system may interact with each other to manage a blockchain, which may be a data structure used to store information related to the decentralized P2P system. More specifically, the blockchain may be a chronological linkage of data elements (e.g., blocks) which store data records relating to the decentralized computing system.

Data records in a blockchain may be in the form of transactions between different nodes of the P2P system. Nodes in a P2P system may each add transactions to a transaction pool for generation of new blocks. Various aspects described herein relate to management of blockchain parameters (e.g., a block size/number of transactions per block) associated with a blockchain. More specifically, an artificial intelligence (AI)-based approach for dynamic management of blockchain parameters is described. Blockchain parameters may be adjusted by artificial intelligence (AI) engine based on various performance metrics associated with various nodes (e.g., input/output (I/O) load, network bandwidth, etc.). Optimization of parameters associated with creation of a blockchains may reduce overall resource utilization at the nodes (e.g., processing time, processing power, etc.) and optimize blockchain operation.

Data records may correspond to any form of data that may be stored in a block. The data records stored in a block may be queried by a node of the P2P system. While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, Internet of things (e.g., IoT), prediction platforms, currency exchange and remittance, P2P transfers, ride sharing, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A private blockchain may comprise nodes associated with an enterprise organization and may further include nodes associated with external entities that that the enterprise organization may interact with. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Data records in a blockchain may correspond to worklists associated with workflows of an enterprise organization. A worklist may comprise a sequential listing of worklist tasks that may be performed by different entities within an enterprise organization and/or external entities that may interact with the enterprise organization. Enterprise organizations may use worklists for organizing operations, both internal (e.g., involving different departments/individuals in the organization) and external (e.g., involving interactions with external entities). Tasks associated with a worklist may be manual (e.g., to be performed by a particular user), automated (e.g., to be performed by a computing device/server), or a combination of the two. In an example, a worklist task may correspond to a smart contract between multiple entities. Completion of a task by an entity may result in automated execution of a next task in the worklist and/or a notification to another entity to process the next task in the worklist, for example, based on a smart contract script embedded in the blockchain. Creation of a worklist (e.g., with one or more worklist tasks) and/or updates to an existing worklist (e.g., completion of a worklist task, edits to the worklist task, addition of a worklist task to the worklist etc.) may result in addition of blocks to the blockchain. For example, any update to an existing worklist or generation of a new worklist may be in the form of a transaction. The transaction may be stored in a new block of the blockchain in accordance with various procedures described herein.

Decentralization of workflow management, via blockchain, may ensure that a trusted intermediary is not required between different entities associated with a workflow. Further, decentralization may ensure that a single node is unable to remove or modify transactions already recorded in the blockchain. The nodes work together to ensure that the blockchain remains trusted and comprises an immutable record of prior transactions associated with the workflow.

In more detail, a decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., worklist tasks, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "worklist tasks" and/or "smart contract operations." A smart contract operation, as used herein, may describe one or more operations performed by a "smart contract," which may be one or more algorithms and/or programs associated with one or more nodes within a decentralized P2P network. The one or more algorithms and/or programs may correspond to one or more tasks associated with a workflow.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network.

A user may access the decentralized P2P system through a key that serves to uniquely identify the user and enable the user to perform functions related to the decentralized P2P network. Using the key, the user may be able to request network-specific functions related to the decentralized P2P system (e.g., initiating a new worklist, creation of worklist tasks, updating an existing worklist/worklist task, etc.). For example, the user may create one or more worklist tasks, with each worklist task being associated with another user and/or an entity in the decentralized P2P system. One or more computing devices forming the decentralized P2P computing system may operate to perform the network-specific functions requested by the user. In performing the network-specific functions, the various computing devices may produce blocks that store the data generated during the performance of the network-specific functions and may add the blocks to a blockchain.

For example, a user may provide a request to the decentralized P2P system to add a new worklist to the blockchain. For example, the worklist may correspond to creation of a new mortgage account, processing a credit card application, processing a wire transfer, etc. With reference to creation of a mortgage account, for example, the worklist may comprise different worklist tasks such as generation of a client profile (e.g., including information associated with the client), verification of client information, approval of the mortgage account, etc. Verification of the client information and the approval of the mortgage account may further include review by multiple entities, both within the organization and by entities external to the organization. One or more of computing devices forming the decentralized P2P computing system may add information associated with the worklist tasks as transactions in a transaction pool. One or more of computing devices forming the decentralized P2P computing system may update the worklist tasks (e.g., to indicate cancelation/completion of the worklist tasks) via transactions in a transaction pool. Based on the transaction pool, a block may be created and added to the blockchain by the various computing devices of the decentralized P2P computing system. For example, when a request to add a new worklist is received in the decentralized P2P system, the nodes may work together to create one or more blocks that comprises the worklist (and/or the worklist tasks). One or more nodes in the decentralized P2P system may be authorized to access and modify the worklist/worklist tasks as stored in a block of the blockchain. For example, the worklist/worklist task may indicate public key(s) of the authorized node(s).

If a node performs one of the worklist tasks (e.g., verification of client information), a new transaction may be created (e.g., indicating that the one of the worklist tasks has been completed) and added to the transaction pool. Another block may then store the new transaction. A node may query the blockchain to determine a status of a worklist task (e.g., whether the worklist task has been completed, and/or other information associated with the worklist task). The use of a blockchain may enable a node to query the entire history associated with the worklist and individual tasks associated with the worklist. Records already stored on the blockchain are immutable and any updates made to the records can be tracked (e.g., without losing previously stored information).

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and exploitation and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to each of the computing devices comprising server infrastructure 110. The local network connecting auto identification and mapping computing platform 120, system infrastructure 130, and/or post-performance review computing device 140 may interface with network 150 and enable communication with user computing devices 110A-110N.

Furthermore, in some embodiments, centralized computer system 100 may include a plurality of computer systems arranged in an operative networked communication with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and exploitation and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
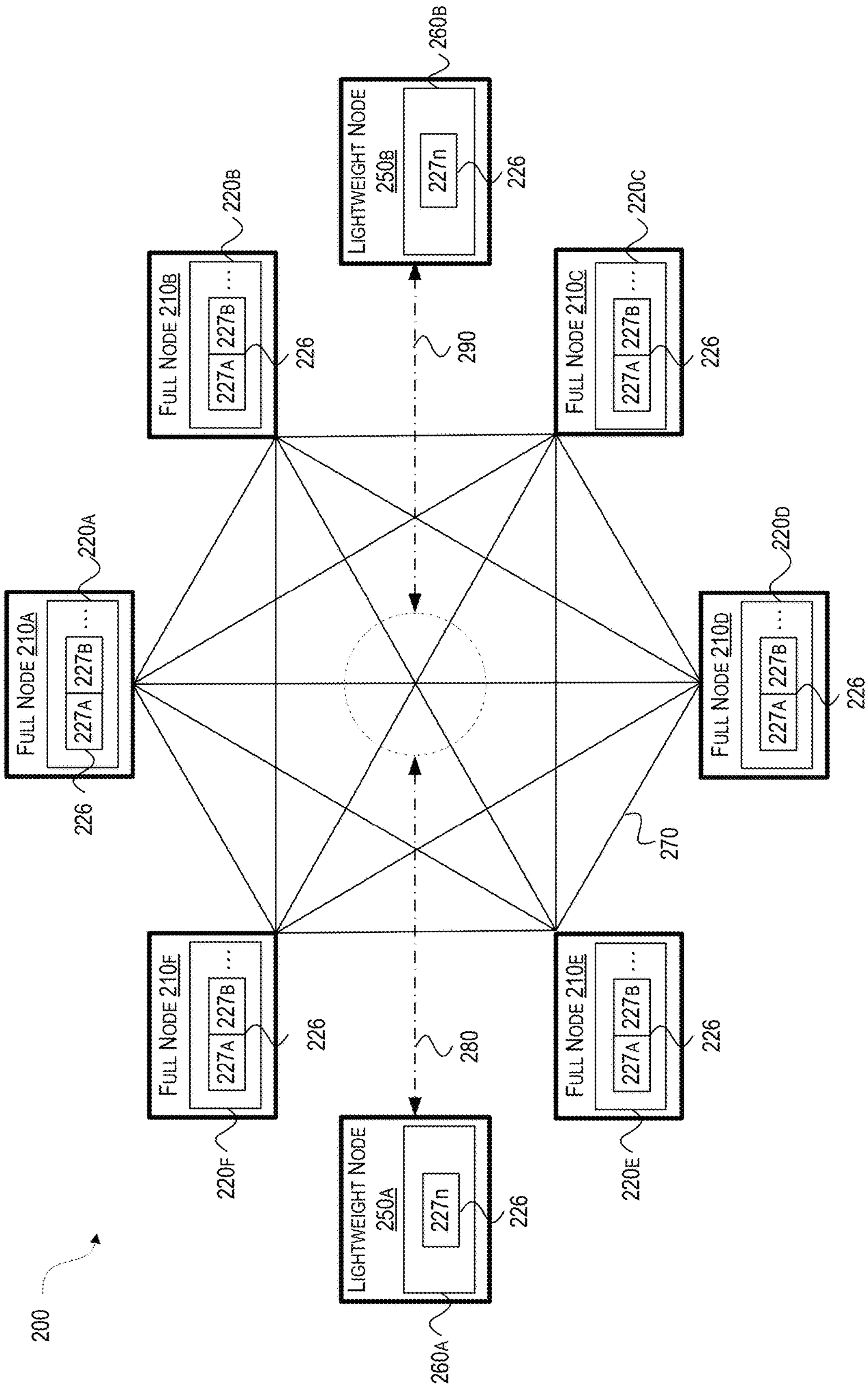
FIG. 2 depicts an illustrative example of decentralized peer-to-peer (P2P) computer system that may be used in accordance with one or more illustrative aspects described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200 and create decentralized P2P network 270. Furthermore, the execution of network protocols by the processors, ASIC devices, and/or graphics processing units (e.g., GPUs) of full node computing devices 210A-210F may cause full node computing devices 210A-210F to execute network functions related to blockchain 226 and thereby maintain decentralized P2P network 270.

Lightweight node computing devices 250A and 250B may request execution of network functions related to blockchain 226 in decentralized P2P network 270. In order to request execution of network functions, such as worklist operations (e.g., worklist tasks in a workflow), processors of lightweight node computing devices 250A and 250B may execute network commands to broadcast the network functions to decentralized P2P network 270 comprising full node computing devices 210A-210F.

As described above, a workflow may comprise one or more worklist tasks. A node (e.g., lightweight node or full node) may send a worklist item to one or more other nodes in the decentralized P2P network 270. The worklist item may comprise indications of worklist tasks to be added in workflow and/or updates to existing worklist tasks in a workflow. The worklist item may indicate a source node sending the worklist item and one or more destination nodes for the worklist item (e.g., a node which may access the worklist item). The nodes of the decentralized P2P network 270 may work together to generate a block based on the worklist item and add the block to the blockchain.

As an example, the lightweight node computing device 250A may request execution of a worklist item at another node in the decentralized P2P network 270. For example, a worklist item may relate to functions to be performed at a lightweight node computing device 250B. This may entail a data transfer from a private/public key associated with lightweight node computing device 250A to a private/public key associated with lightweight node computing device 250B. In doing so, processors of lightweight node computing device 250A may execute network commands to broadcast a worklist network function request 280 to decentralized P2P network 270. Worklist network function request 280 may include details about worklist item(s) (e.g., worklist task(s) requested to be completed at the lightweight node computing device 250B, worklist task(s) completed at the lightweight node computing device 250A, details associated with the worklist task, updates to worklist task(s) in a workflow, etc.) to full node computing devices 210A-201F of decentralized P2P network 270 for executing worklist network function request 280. For example, with reference to an example where a worklist is associated with creation of a mortgage account, a worklist network function request 280 may indicate that a user associated with lightweight node computing device 250B needs to review details associated with a client and determine whether to approve the mortgage account.

Worklist network function request 280 may further include the public key associated with lightweight node computing device 250B. Processors of lightweight node computing device 250A may execute digital signature algorithms to digitally sign worklist network function request 280 with the private key associated with lightweight node computing device 250A. Keys may ensure that data associated with a particular worklist/work item is only accessible to authorized nodes.

At decentralized P2P network 270, worklist network function request 280 may be broadcasted to each of full node computing devices 210A-210F through execution of network protocols by full node computing devices 210A-210F. In order to execute worklist network function request 280 and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of worklist network function request 280. The resultant digest of worklist network function request 280, in turn, may be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the worklist network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the worklist network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the worklist network function request 280, and block hash of the most immediately preceding block of blockchain 226. In various examples, other consensus algorithms may be used (e.g., proof of stake, delegated proof of stake, practical byzantine fault tolerance (PBFT), etc.).

For example, in embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F to create a new block with a block header (e.g., block hash), which is a digest that combines the digest of worklist network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. After the new block has been added to blockchain 226, worklist network function request 280 may be considered to be executed and the data transfer may be registered. Based on the execution of the workflow/worklist item, the lightweight node computing device 250B may access the workflow/worklist item.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including worklist network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including worklist item sheet transaction network function request 280. The root digest of the requested network function, in turn, may be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including worklist network function request 280, may be considered to be executed and the data transfer from the private/public key associated with lightweight node computing device 250A to the private/public key associated with lightweight node 250B may be registered.

While the description provided above is made in relation to a worklist items involving lightweight node computing device 250A and lightweight node computing device 250B, it is to be understood that worklist items are not limited to lightweight node computing device 250A and lightweight node computing device 250B, but rather may be made across any of the full node computing devices and/or lightweight node computing devices in decentralized P2P system 200.

A worklist item may be configured with a smart contract to support programmable scripts. The programmable scripts may be used to enforce various rules associated with the smart contract. For example, lightweight node computing device 250B may request a smart contract operation related to a worklist item in decentralized P2P network 270, which may facilitate a dual data transfer between a private/public key associated with lightweight node computing device 250B and a private/public key associated lightweight node computing device 250A. Processors of lightweight node computing device 250B may execute network commands to broadcast smart contract operation network function request 290 to decentralized P2P network 270. Smart contract operation network function request 290 may include details about the data transfer (e.g., such as data type, a data transfer amount) to full node computing devices 210A-210F of decentralized P2P network 270 for executing smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. After the new block has been added to blockchain 226, smart contract operation request 290 may be considered to be executed and the data transfer from the private/public key associated with lightweight node computing device 250B to the private/public key associated with the smart contract may be registered.

The smart contract may be configured to hold the data transfer from the private/public key associated with lightweight node computing device 250B until fulfillment of certain predetermined criteria hardcoded into the smart contract is achieved. The smart contract may be configured such that it serves as an intermediate arbiter between entities within the decentralized P2P network 270 and may specify details of a dual data transfer between entities. For example, completion of a worklist item at the lightweight node computing device 250B may initiate a notification to the lightweight node computing device 250A.

Lightweight node computing device 250A may also request a smart contract operation related to blockchain 226 in decentralized P2P network 270, which may conclude the dual data transfer between a private/public key associated lightweight node computing device 250A and a private/public key associated with lightweight node computing device 250B. Processors of lightweight node computing device 250A may execute network commands to broadcast the smart contract operation network function request to decentralized P2P network 270. The smart contract operation network function request may include details about the data transfer to full node computing devices 210A-210F of decentralized P2P network 270 for executing the smart contract operation network function request. The smart contract operation network function request may further include the public key associated with the smart contract. Processors of lightweight node computing device 250A may execute digital signature algorithms to digitally sign the smart contract operation network function request with the private key associated with lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. After the new block has been added to blockchain 226, the smart contract operation transaction network function request 290 may be considered to be executed and the data transfer from the private/public key associated with lightweight node computing device 250A to the private/public key associated with the smart contract may be registered.

When the smart contract receives the data value from each of lightweight node computing device 250A and lightweight node computing device 250B, the smart contract may transfer the data value from lightweight node computing device 250A to lightweight node computing device 250B and the data value from lightweight node computing device 250B to lightweight node computing device 250A.

The smart contract may be configured to initiate a signal from the private/public key associated with lightweight node computing device 250B based on fulfillment of certain predetermined criteria hardcoded into the smart contract is achieved. For example, the contract may specify a time period within which a worklist item must be completed at the lightweight node computing device 250B. Non-completion of a worklist item at the lightweight node computing device 250B within the specified time period may initiate a notification to the lightweight node computing device 250A.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 270 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figure 3A:
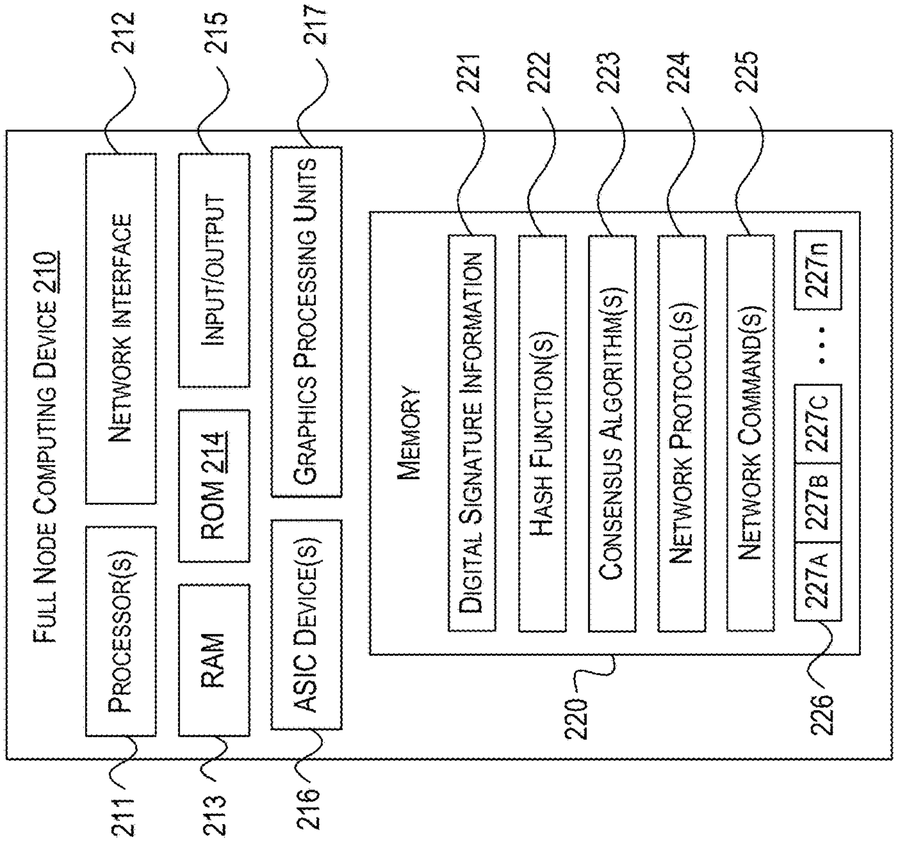
FIG. 3A depicts an illustrative example of a full node computing device that may be used in accordance with one or more illustrative aspects described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or to execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer, and the like), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as worklist tasks and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227*n*, wherein block 227A represents the first block (e.g., genesis block) of blockchain 226 and block 227*n* represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

Figure 3B:
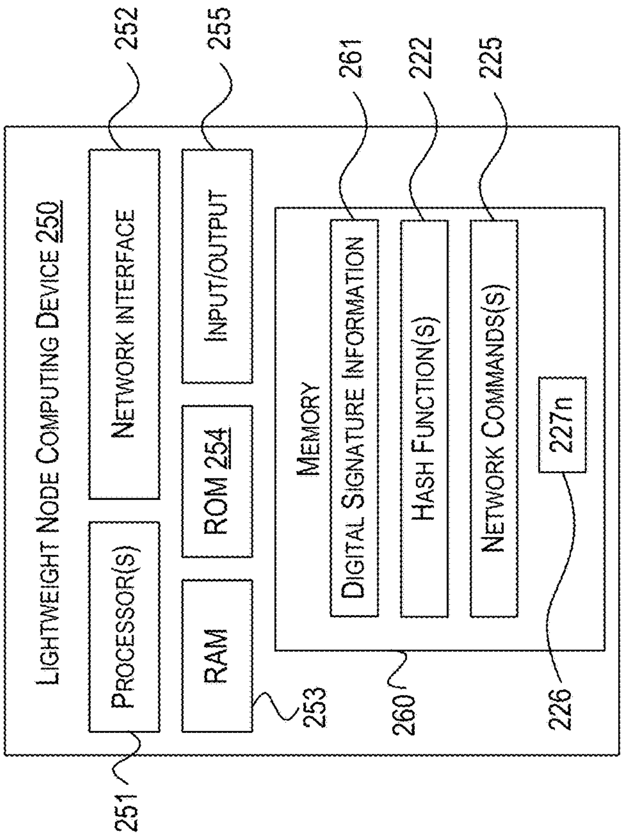
FIG. 3B depicts an illustrative example of a lightweight node computing device that may be used in accordance with one or more illustrative aspects described herein.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different than full node computing device 210 in that it is not configured to execute network functions and/or operate to maintain a blockchain of a decentralized P2P network. In other aspects, lightweight node computing device 250 may have substantially the same physical configuration as full node computing device 210, but configured with different programs, software, and the like.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer, and the like), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary, support, and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such is the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different than that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as worklist tasks and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227*n*, wherein block 227*n* represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227*n*, wherein block 227A represents the first block (e.g., genesis block) of blockchain 226 and block 227*n* represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Figure 4:
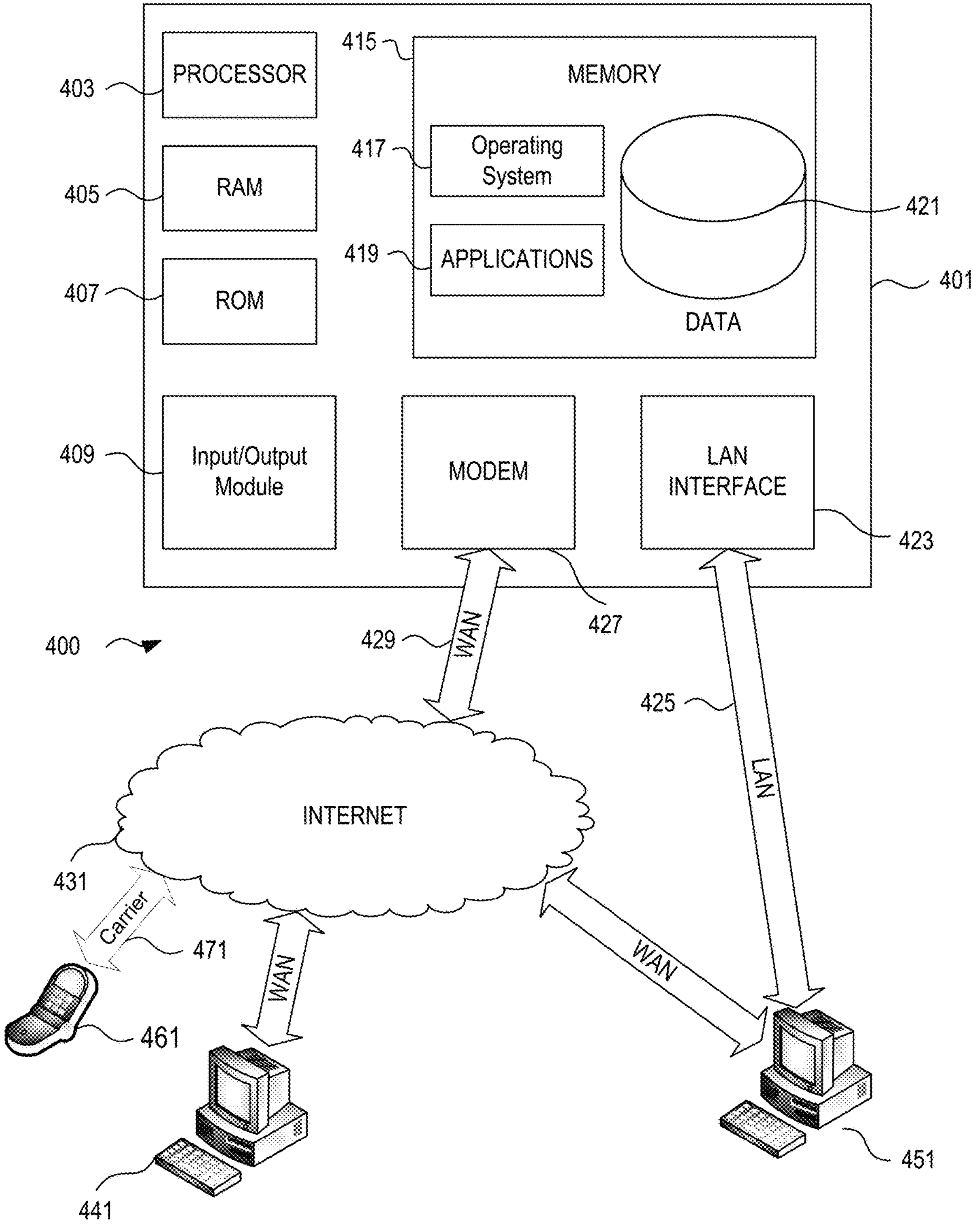
FIG. 4 depicts an illustrative example of a suitable computing system environment that may be used in accordance with one or more illustrative aspects described herein.

FIG. 4 illustrates an example of a computing system environment 400 that may be used according to one or more illustrative embodiments. The computing system environment 400 is only one example of a suitable computing environment and is not intended to suggest any limitation as to the scope of use or functionality contained in the disclosure. The computing system environment 400 should not be interpreted as having any dependency or requirement relating to any one or combination of components shown in the computing system environment 400.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 4, the computing system environment 400 may include a computing device 401 wherein the processes discussed herein may be implemented. The computing device 401 may have a processor 403 for controlling overall operation of the computing device 401 and its associated components, including random-access memory (RAM) 405, read-only memory (ROM) 407, input/output module or communications module 409, and memory 415. Computing device 401 typically includes a variety of computer readable media. Computer readable media may be any available media that may be accessed by computing device 401 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 401.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 400 may also include optical scanners (not shown). Exemplary usages include scanning and converting paper documents, e.g., correspondence, receipts to digital files.

Although not shown, RAM 405 may include one or more applications representing the application data stored in RAM 405, while the computing device is on and corresponding software applications (e.g., software tasks) are running on the computing device 401.

Communications module 409 may include a microphone, keypad, touch screen, and/or stylus through which a user of computing device 401 may provide input, and may also include one or more of a speaker for providing audio output and a video display device for providing textual, audiovisual and/or graphical output.

Software may be stored within memory 415 and/or storage to provide instructions to processor 403 for enabling computing device 401 to perform various functions. For example, memory 415 may store software used by the computing device 401, such as an operating system 417, application programs 419, and an associated database 421. Also, some or all of the computer executable instructions for computing device 401 may be embodied in hardware or firmware.

Computing device 401 may operate in a networked environment supporting connections to one or more remote computing devices, such as computing devices 441, 451, and 461. The computing devices 441, 451, and 461 may be personal computing devices or servers that include many or all of the elements described above relative to the computing device 401. Computing device 461 may be a mobile device communicating over wireless carrier channel 471.

The network connections depicted in FIG. 4 include a local area network (LAN) 425 and a wide area network (WAN) 429, but may also include other networks. When used in a LAN networking environment, computing device 401 may be connected to the LAN 425 through a network interface, such as LAN interface 423, or to an adapter in the communications module 409. When used in a WAN networking environment, the computing device 401 may include a modem in the communications module 409, a modem separate from the communications module 409, such as modem 427, or other means for establishing communications over the WAN 429, such as the Internet 431 or other type of computer network. It will be appreciated that the network connections shown are illustrative and other means of establishing a communication link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 419 used by the computing device 401, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 401. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 401. Such a processor may execute computer-executable instructions stored on a computer-readable medium.

Figure 5:
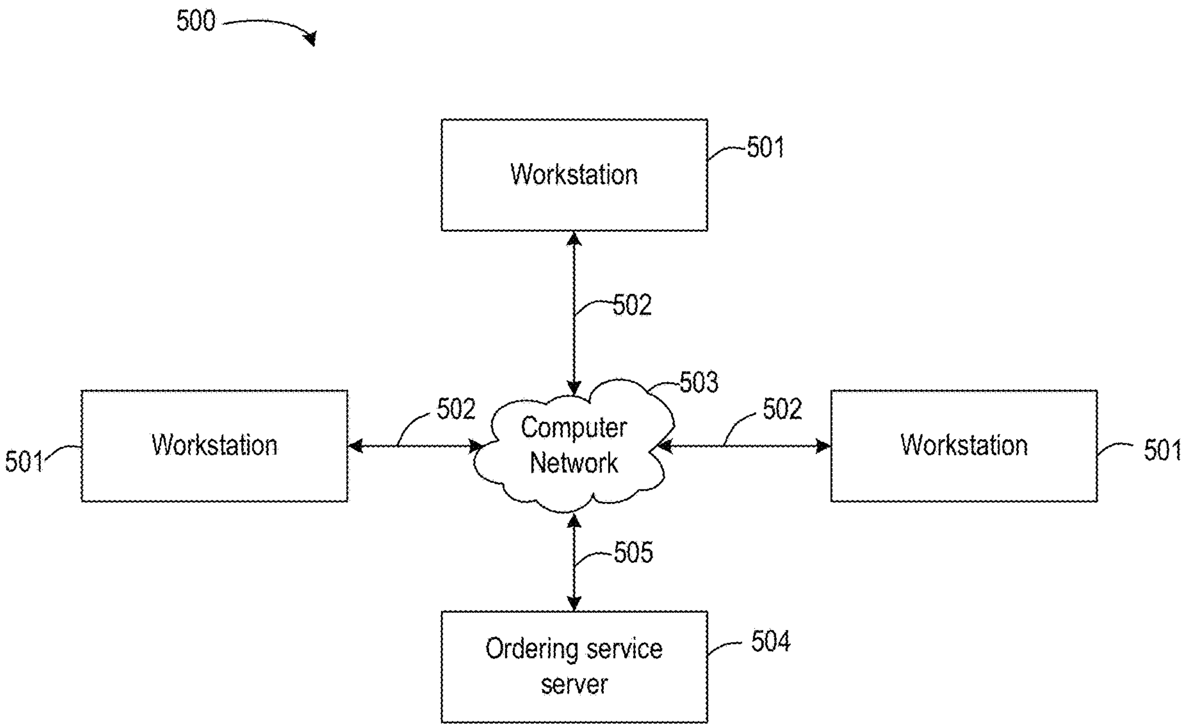
FIG. 5 depicts an illustrative example of a system in accordance with one or more illustrative aspects described herein.

Referring to FIG. 5, an illustrative system 500 for implementing example embodiments according to the present disclosure is shown. As illustrated, system 500 may include one or more workstation computers 501. Workstations 501 may be local or remote, and may be connected by one of communication links 502 to computer network 503. In system 500, an ordering service server 504 may comprise any suitable server, processor, computer, or data processing device, or combination of the same. The ordering service server 504 may be used to process the instructions received from, and the transactions entered into by, one or more participants.

Computer network 503 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communication links 502 and 505 may be any communication links suitable for communicating, such as network links, dial-up links, wireless links, and hard-wired links.

The steps that follow in the Figures may be implemented by one or more of the components in FIGS. 4 and 5 and/or other components, including other computing devices.

In some aspects, other forms of communications via one or more of communication links can include multi-lateral private message communications. As an example, if a "51%" blockchain problem is anticipated such that a single blockchain user could obtain control of a majority or a near majority of the blockchains in a network in a manner that could render the network vulnerable, one or more of the above communication links can use multi-lateral private messages to communicate sensitive data. Upon a determination that the threat of an attack has been eliminated, the communications can return to using blockchains. Examples of communications and monitoring for preventing such an attack are described below regarding FIG. 6.

By using blockchain nodes/distributed ledgers, information can be communicated in a secure and transparent manner based on blockchain technology described above regarding FIGS. 1, 2, and 3. Blockchain nodes/distributed ledgers have advantages over other forms of communicating data, including, e.g., advantages of immutability, security, traceability, and recovery, described further below.

Immutability refers to something that is unchanging over time, or unable to be changed. In aspects of the disclosure, once data is written to a blockchain, that data cannot be changed—not even by a system administrator or other person having a high level of access. Communicating data via blockchains, as described herein, provides immutability that is particularly advantageous from audit and compliance perspectives relevant to financial transactions. A provider of data that communicates using blockchains as disclosed herein can prove that the data has not been altered. Similarly a recipient of data communicated via blockchains as disclosed herein can be assured that the data has not been altered.

Security is at a very high level with respect to blockchain based communications disclosed herein. By communicating financially sensitive information via blockchain nodes/distributed ledgers, as described herein, this information can be transferred and stored in a highly secure manner.

Traceability is another advantage of blockchain based communications disclosed herein. As examples, transaction audit logs and other traceability features of blockchain based communications disclosed herein provide support for preservation of information and transparency of transactions. As an example, if a party wants to determine any changes made to an agreement, or wants to return to a previous agreement or information, the prior data of the blockchain is readily available and traceable to do so.

Data recovery can be an advantageous feature of blockchain based communications disclosed herein. As described herein, a plurality of blockchain nodes can each maintain a copy of blockchain distributed ledgers in a network.

Decentralization, as enabled by a P2P network enables trust in the system as it does not require any third-party to mediate worklists involving different nodes. Worklist data stored in a blockchain is hard to revise and tamper. The blockchain may serve as an immutable and trusted ledger that records and validates every operation during workflow execution. Use of signatures may ensure that only authorized users (with a valid key) can initiate/update transactions associated with a worklist. Further, the inclusion of smart contracts may provide support for implementing rules and/or updating the workflow tasks as programmable scripts. Encryption may be used to restrict access to data stored (e.g., worklist tasks) in blockchain (which is otherwise available to all nodes) to participants who have the privileges.

Figure 6:
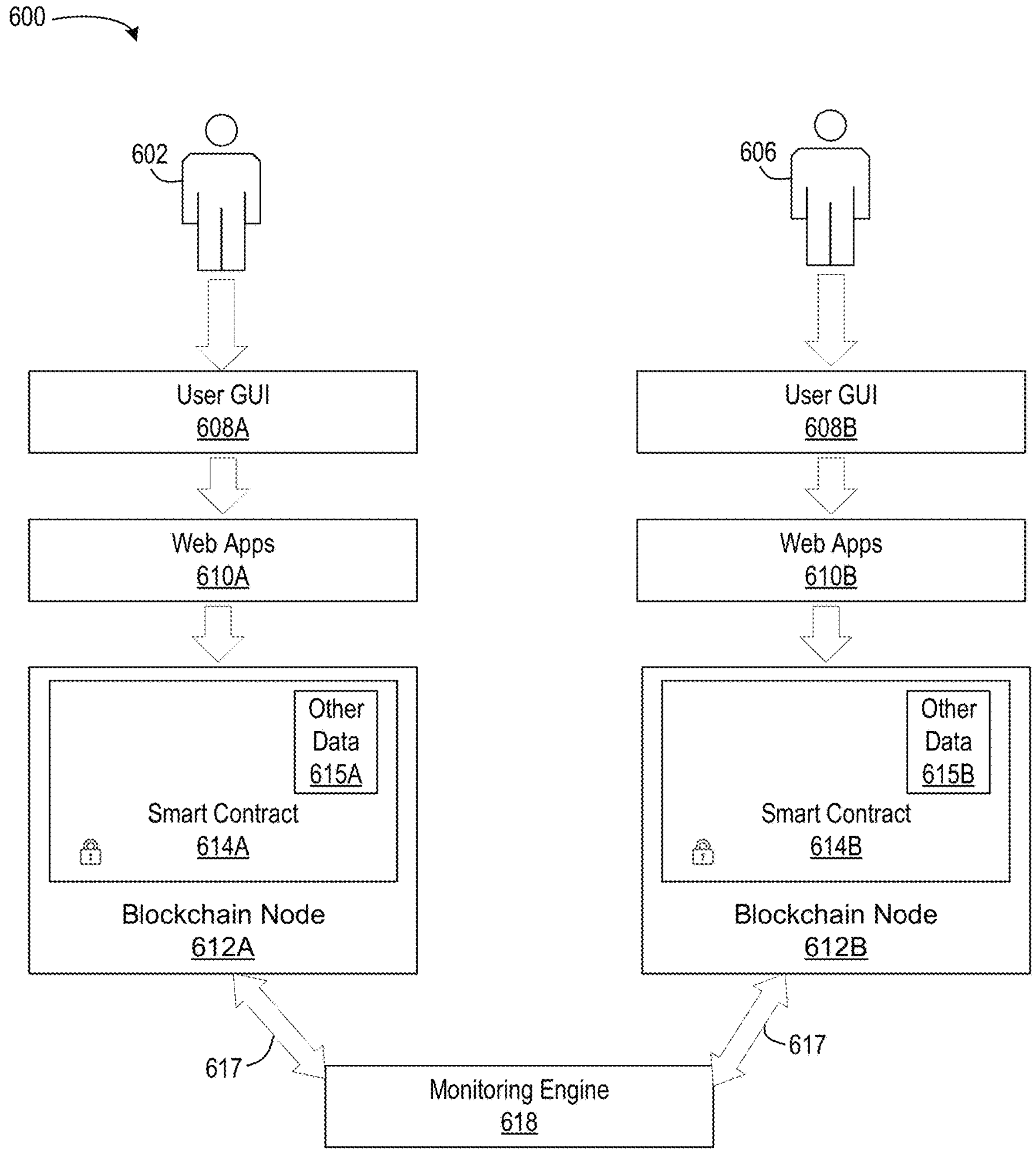
FIG. 6 depicts an illustrative example of a high-level system diagram for a blockchain based system in accordance with one or more illustrative aspects described herein.

FIG. 6 provides additional examples of aspects of the present disclosure relating to blockchain-based distributed worklists/shared contracts that may be implemented by one or more of the components in FIGS. 2-5 and/or other components, including other computing devices. FIG. 6 depicts a plurality of users 602 and 606 in a system 600 for sharing smart contracts 614A and/or 614B among a plurality of blockchain nodes 612A and 612B. While only two blockchain nodes 612A and 612B are shown, system 600 can include any number of blockchain nodes across a network. In some examples, user 602 may correspond to user 702 in FIG. 7, a user at user interface, or any other user described herein. User 606 could correspond to another user (e.g., assigned to a worklist task) and may be able to access certain data as input by the user 602. For example, user 606 may correspond to user 704 in FIG. 7. Users 602 and 606 may correspond to users with the same or different access rights to the blockchain. For example, user 602 may be a representative of a financial services provider and may input information associated with a particular worklist for processing by various nodes/users. For example, the worklist may comprise various worklist items associated with opening a mortgage account, initiating a wire transfer, and/or other services that may be provided by the financial services provider. User 606 may correspond to a user assigned a specific task in the worklist and may access the information input by the user 602. For example, the user 606 may review the information input by the user 602 and approve the mortgage account or the wire transfer. Any number of users may be provided with respective one or more various types of levels of access of data in system 600.

Each user 602 and 606 can communicate in system 600 via respective user graphical user interfaces (GUIs) or other form of interface, such as GUI 606A (e.g., by user 602) and GUI 608B (e.g., by user 606). The GUIs 608A and 608B can operate in connection with one or more applications, such as respective Web applications ("Web Apps") 610A and 610B. Users 602 and 606 can use a Web App 610A and 610B, via a respective User GUI 608A and 608B in a computer device, such as computing device 401 described above, to communicate regarding a smart contract 612A and/or 612B (e.g., corresponding to one or more worklist items) stored at a respective blockchain node 612A and/or 612B. The smart contract can be stored in a blockchain node 612A, which can include, e.g., a blockchain node storing blockchain distributed ledgers described above regarding FIG. 6. In addition, a copy of the smart contract 612A can be stored as smart contract 614B in blockchain node 612B.

System 600 can optionally include a monitoring engine 618 in communication with blockchain nodes 612A and 612B via communication links 617. Monitoring engine 618 can be located at any location in a network, including, e.g., in a cryptography machine learning enabled blockchain based apparatus described herein or remote therefrom. Monitoring engine 618 can be used to monitor communications between blockchain nodes throughout a network, including, e.g., blockchain nodes 612A and 612B. As examples, monitoring engine 618 can be used to detect and prevent a "51%" attack such as described above. In some embodiments, monitoring engine 618 can determine whether a party has control of within a threshold amount of blockchains, such as 40%, 45%, 46%, 49%, 50%, or 51%. If control of 50% or more of blockchain in a network by one party is detected, one or more communication links such as described above, e.g., regarding FIG. 6, can switch from using blockchains to using multi-lateral private messages for communications of sensitive data. Similar operations can be performed if control of a threshold amount below 50% (e.g., 49%, 46%, 45%, 40%) of blockchains by one party is detected so as to prevent a "51%" attack. As another example, if monitoring engine 618 detects one party, or a number of related parties, obtains or appears to attempt to obtain a threshold amount of blockchains that could lead to a "51%" or similar attack on the blockchain network, additional monitoring can be performed, such as increasing frequency of monitoring activities or adjusting to an increased level of security, e.g., using permissioned blockchains. If at any point in time a "51%" attack is anticipated or detected, any of the blockchain communications described herein can be switched, either permanently or temporarily, to using multi-lateral private messages for communications. If a threat subsides, multi-lateral private messages for communications can return to blockchain communications.

Figure 7:
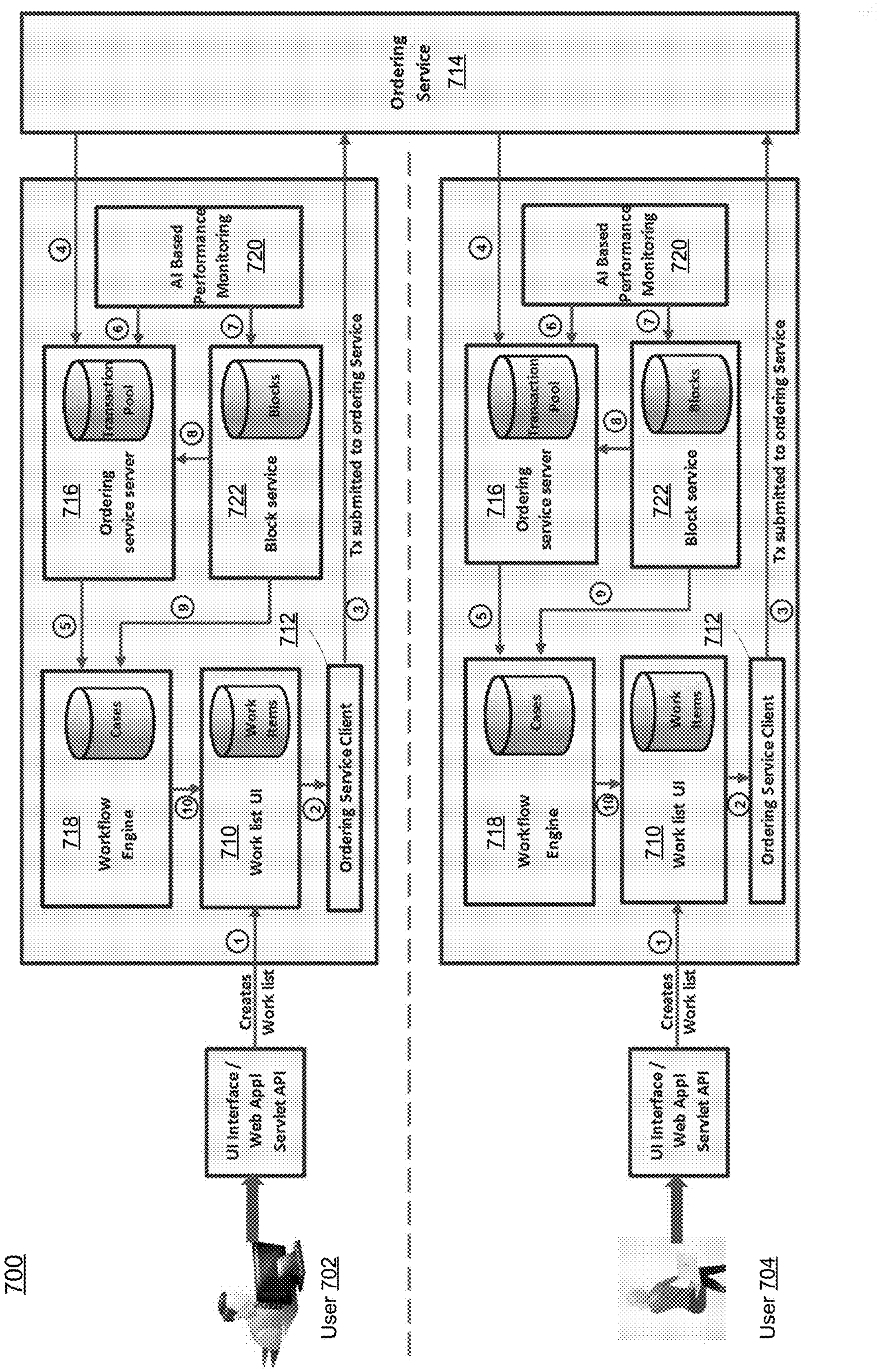
FIG. 7 depicts an example architecture for a P2P network for workflow management in accordance with one or more illustrative aspects described herein.

FIG. 7 shows an example architecture for a P2P network 700 for workflow management. A user 702 may use a GUI associated with a web application to create one or more worklist items. A worklist item may indicate a new workflow (e.g., with one or more worklist tasks), or an update to existing workflow/worklist task(s). An update to an existing workflow/worklist task may comprise modifying information associated with the worklist task (e.g., adding information, indicating completion, indicating abandonment, etc.). The worklist item (e.g., for a new workflow) may indicate one or more worklist tasks, and each of the worklist task may indicate a corresponding user/entity (e.g., a computing device or server) associated with the worklist task as well as information associated with the worklist task (e.g., details associated with the worklist task for review by a user). A worklist task may indicate scripts that may executed by one or more computing devices/servers assigned the worklist task.

A worklist UI module 710 may receive the worklist item, create a transaction based on the worklist item, and send the transaction to an ordering service client 712. Creating the transaction may comprise formatting the information included in the worklist item to a prescribed format for further processing by the P2P network. The ordering service client 712 may submit the transaction to an ordering service 714 associated with the P2P network. The transaction may be signed by a key (e.g., a private key) associated with the user 702. The transaction may comprise identifiers (e.g., public keys) associated with other nodes that may access the transactions.

For example, the P2P network may correspond to a financial institution, and the worklist may comprise a worklist item corresponding to a workflow for creating a mortgage account. The worklist item may comprise a worklist task such as verifying details (e.g., personal details, credit history, credit score, etc.) associated with a client requesting a mortgage account. The worklist item may further comprise the details to be verified, which may only be accessible to authorized users associated with the worklist task. The transaction may indicate one or more identifiers (e.g., public keys) of the authorized users. For example, the worklist item may be assigned to a user 704, and the transaction may indicate an identifier of the user 704.

As another example, the worklist may comprise a worklist item corresponding to a workflow for a wire transfer. The worklist item may comprise a plurality of worklist tasks. The plurality of worklist tasks may comprise verifying details (e.g., source account, destination account, transfer value etc.) associated with a wire transfer, sending a transfer request to a server associated with a wire transfer service, and verifying that the wire transfer has been successfully received at the destination account. The transaction may indicate public keys of one or more other users that have been assigned the worklist tasks. For example, a first worklist task (e.g., verifying wire transfer details, such as source account balance, destination account, transfer value) may be assigned to a user 704, and a second worklist task (e.g., sending the wire transfer request) may be assigned to another user (e.g., or a server) associated with a wire transfer network.

The ordering service 714 may pass the transaction to the ordering service server 716. The ordering service server 716 may add the transaction to a transaction pool. The transaction pool may be shared among different users associated with the P2P network 700. The ordering service server 716 may further send the transaction to a workflow engine 718 for validating the transaction. Validating a transaction may comprise checking whether a user is authorized to create a worklist, or update an existing worklist/work item.

Once the transaction is validated, the ordering service 716 may create a case associated with the transaction. The case may indicate various attributes associated with the transaction. For example, the case may indicate whether the transaction is for launching a new workflow (e.g., comprising one or more worklist tasks), executing an activity (e.g., associated with an existing worklist task), aborting/canceling an existing workflow, etc. With reference to an example where a new workflow is created, the case may indicate that the transaction is for launching a new workflow. With reference to an example where an existing worklist task is modified (e.g., completed, edited), the case may indicate that the transaction is for modifying the existing worklist task. Each case may be associated with a corresponding case identifier (ID).

An AI-based performance monitoring module 720 may monitor a size of the transaction pool (e.g., a quantity of transactions in the transaction pool), a network bandwidth, an input/output (I/O) load of the transaction pool, etc. Based on these monitored parameters, the AI-based performance monitoring module 720 may adjust a threshold size of the transaction pool. Further details associated with the AI-based monitoring platform are described with reference to FIGS. 9 and 11.

If the size of the transaction pool reaches the threshold size, the AI-based performance monitoring module 720 may send an indication to the block service 722 for creation of a new block. Based on receiving the indication the block service may create a new block including the transactions stored in the transaction pool. The block service 722, for creating the new block, may query the ordering service server 716 for a latest hash value of the blockchain and the transactions stored in the transaction pool.

The block service 722 may send the new block to the workflow engine 718. The workflow engine 718 may receive details associated with blocks as and when they are added to the blockchain. The workflow engine 718 may accordingly update the worklist tasks associated with each user based on the worklist tasks stored in the new block. The workflow engine 718 engine, via the worklists, may manage user interactions with the workflow as well as any external functions as may be executed by worklist items/tasks.

Based on receiving the new block from the block service 722, the workflow engine 718 may update the case listing with details associated with the new block. Further, the workflow engine 718 may create new worklist tasks for local worklists of the users associated with the P2P network.

For example, with reference to the example where the worklist item corresponding to a workflow for creating a mortgage account, the block may indicate a worklist task for the user 704 (e.g., verifying details associated with a client requesting a mortgage account) the workflow engine 718 may update a local worklist of the user 704 with the worklist task. When a user 704 performs the worklist task, the user 704 may indicate completion of the task via a GUI. Performing the worklist task may comprise accessing the details that may be stored in the block (e.g., using a private key associated with the user 704). Various steps described above may be then used to generate a new block indicating completion of the worklist task.

With reference to the example where the worklist item corresponding to a workflow for a wire transfer, the block may indicate a first worklist task for the user 704 (e.g., verifying wire transfer details, such as source account balance, destination account, transfer value). The workflow engine 718 may update a local worklist of the user 704 with the first worklist task. When a user 704 performs the first worklist task, the user 704 may indicate completion of the task via a GUI. Based on steps described above, a new block may be created indicating that the first worklist task has been completed. Based on a script stored in the blockchain and based on the completion of the first task, a notification may be sent to a wire transfer server to process the wire transfer and a new block may be created storing a record of the completed wire transfer.

The P2P network 700 may correspond to a private blockchain network or a public blockchain network. In an arrangement, a plurality of users may submit worklist items to a central entity (e.g., comprising one or more servers, computing devices, etc.) that may perform one more operations described with reference to FIG. 7. For example, the central entity may comprise the worklist UI module 710, the ordering service client 712, the ordering service 714, the ordering service server 716, the workflow engine 718, the AI-based performance monitoring module 720, and the block service 722.

In another arrangement, the P2P network 700 may service a plurality of nodes and each of the plurality of nodes may be associated with one or more users. For example, a first node may be associated with the user 702 and a second node may be associated with the user 704. In this scenario, each of the nodes may be associated with/comprise one or more of a dedicated worklist UI module, an ordering service client, an ordering service server, a workflow engine, an AI-based performance monitoring module, and/or a block service. Each of the nodes may be configured to generate blocks based on worklist items/transactions sent by other nodes.

Figure 8A:
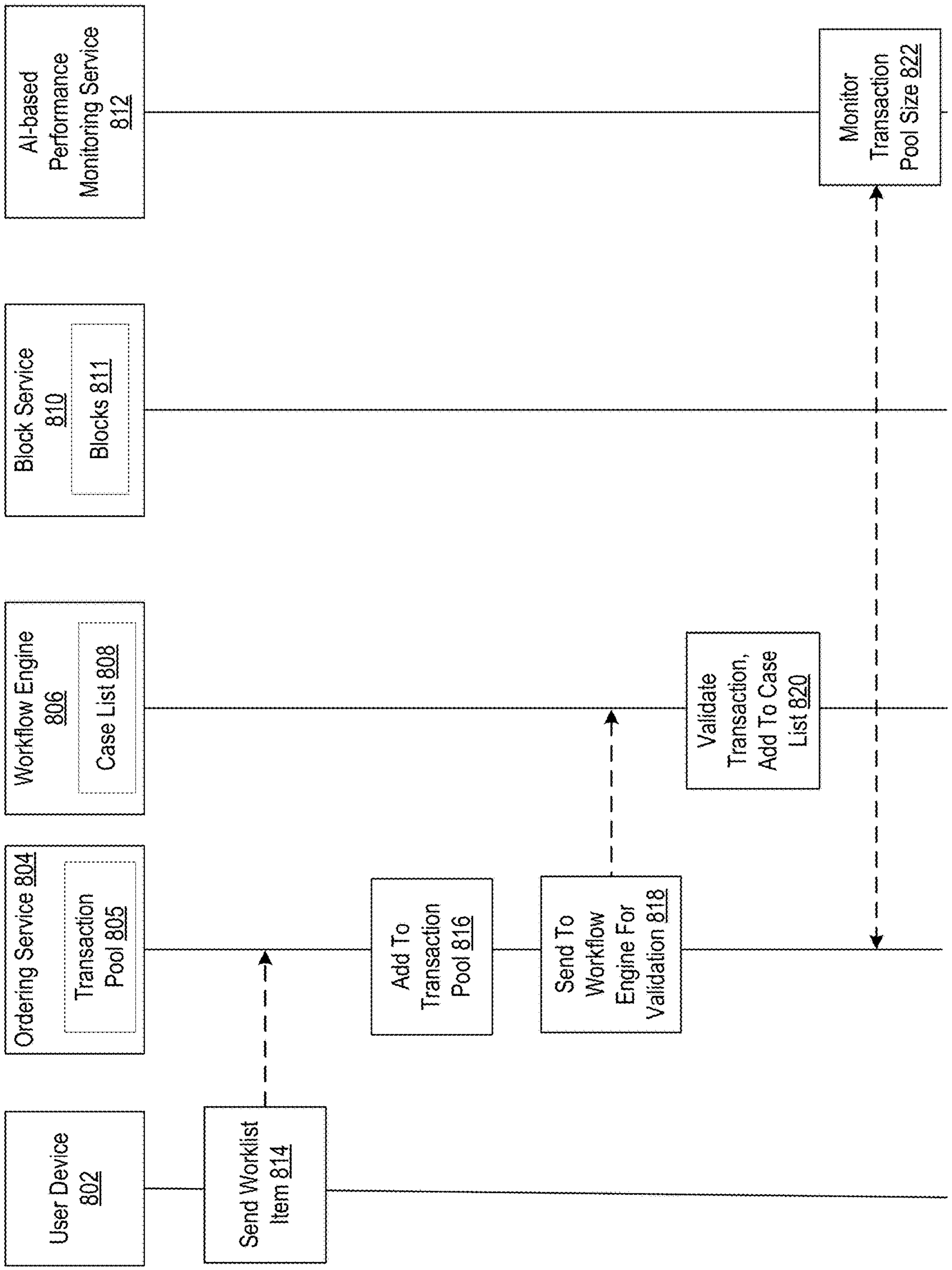
FIGS. 8A and 8B depict an example event sequence for workflow management using a blockchain-based system in accordance with one or more illustrative aspects described herein.
Figure 8B:
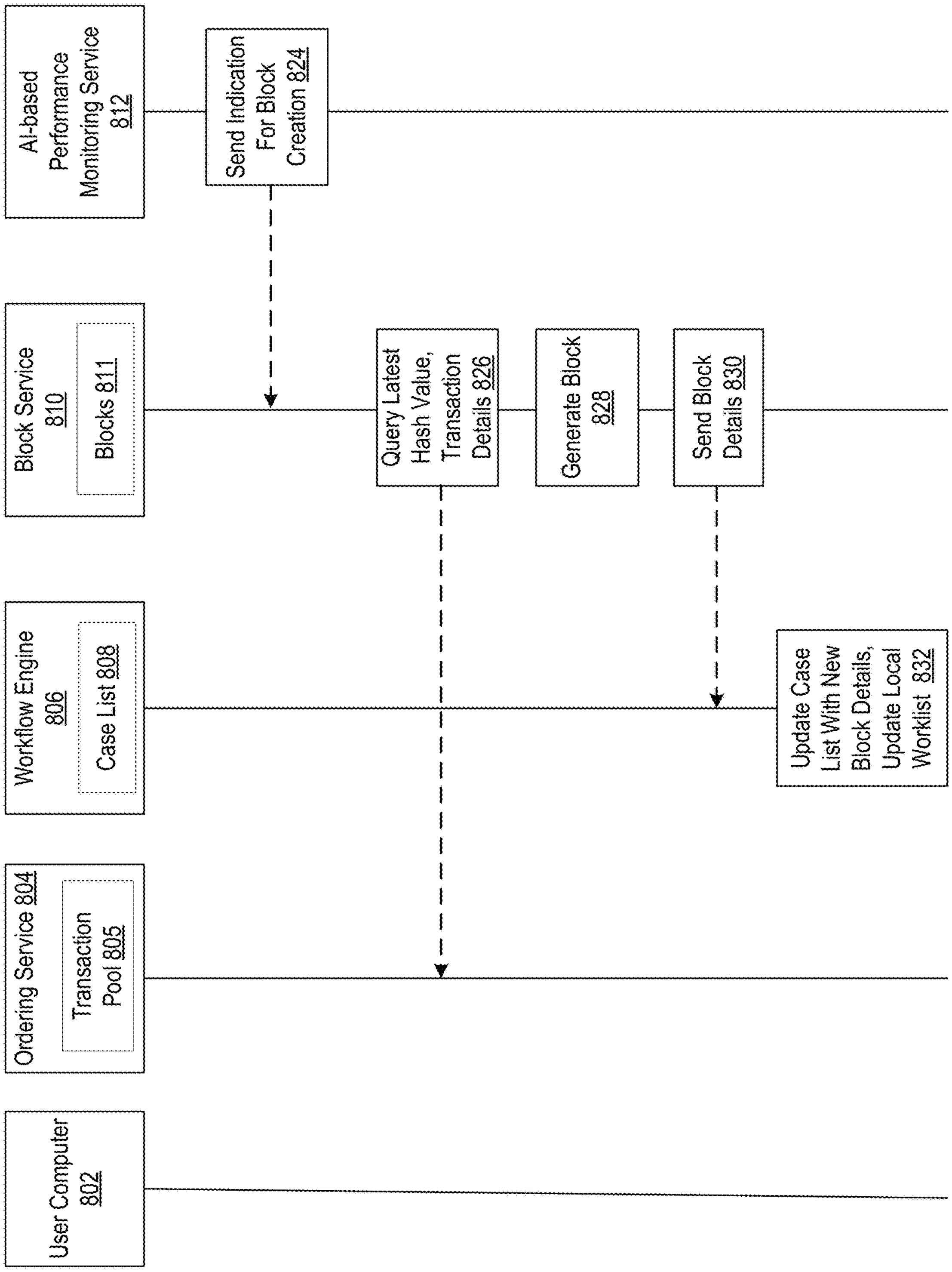

FIGS. 8A and 8B shows an example event sequence for workflow management using a blockchain. At step 814, a user device 802 may cause sending a worklist item to an ordering service 804. For example, a user, associated with the user device 802, may use a GUI to input one or more worklist tasks and/or updates to existing worklist tasks corresponding to a workflow. A worklist item may indicate the one or more worklist tasks and/or updates to existing worklist tasks. Each of the worklist task may further indicate a user/computing entity to which the worklist task is assigned. For example, with reference to an example where the workflow corresponds to a mortgage application, the worklist tasks may comprise: i) a first worklist task for verifying details associated with the mortgage application (e.g., assigned to a first user); ii) second worklist task sending a notification to an external server (e.g., assigned to a notification server), and iii) a third worklist task for approving the mortgage application (e.g., assigned to a second user).

A worklist UI module may create a transaction based on the worklist item, and send the transaction to the ordering service 804. Creating the transaction may comprise formatting the information included in the worklist item to a prescribed format for further processing. At step 816, the ordering service 804 may add the transaction to a transaction pool 805.

At step 818, the ordering service 804 may send the transaction to the workflow engine 806 for validation. At step 820, the workflow engine 806 may validate the transaction. Validating the transaction may comprise determining whether the user device 802 is authorized to send the worklist item for addition to the blockchain. If the transaction is for a new workflow, the workflow engine 806 may further add worklist tasks of a workflow as a case in a case list (e.g., and assign a case name and a case ID for the worklist tasks. Each worklist task may further be assigned a corresponding activity name/ID. The case list may be used for determining worklist tasks for each of the users. For example, as described herein, the case list may be used to add worklist tasks to a local worklist for a user/computing entity (e.g., to which the worklist task has been assigned). The activity name/ID may be used for modifying/updating statuses of worklist tasks.

The AI-based performance monitoring service 812 may monitor an I/O load of the transaction pool 805 (e.g., a rate at which transactions are being added to the transaction pool). Additionally, or alternatively, the AI-based performance monitoring service 812 may monitor a network bandwidth associated with the communications between the in the P2P network. Based on the I/O load and the network bandwidth, the AI-based performance monitoring service 812 may determine a threshold size of the transaction pool 805. Further details associated with determining the threshold size based on the I/O load and network bandwidth are described with reference to FIGS. 9 and 11.

At step 822, an AI-based performance monitoring service 812 may monitor a size of the transaction pool 805 and compare the size with a threshold size. If the size of the transaction pool reaches the threshold size, the AI-based monitoring platform 140 may determine that a new block may be generated based on transactions stored in the transaction pool 805. At step 824, and based on this determination, the AI-based monitoring platform 140 may send, to a block service 810, an indication for block creation.

The block service 810 may be associated with a blockchain comprising a plurality of blocks 811. At step 826, the block service 810 may query a latest hash value (e.g., corresponding to latest block added to the blockchain). The block service 810 may further query the ordering service 804 to determine the transactions included in the transaction pool 805.

At step 828, the block service 810 may generate a new block based on the transactions in the transaction pool 805 and the latest hash value. Generating the new block may comprise generating a hash value based on the transactions stored in the transaction pool. The block service may create the new block based on the generated hash value and the latest hash value as stored in the blockchain. In accordance with proof-of-work consensus, the new block may comprise a nonce value that, when hashed with a digest that combines the generated hash value and the latest hash value in the blockchain, generates a second hash value that comprises a predetermined number of consecutive alphanumerical characters at a predetermined position. Alternatively, any other consensus algorithm may be used for block generation.

Generating the new block may comprise adding a time stamp to the new block. The time stamp may indicate a time of generation of the new block. At step 830, the block service 810 may send details associated with the new block to the workflow engine 806. For example, the block service 810 may send an indicator of the new block (e.g., a block number) to the workflow engine 806.

At step 832, the workflow engine 808 may update cases in the case list with transactions as stored in the new block. The workflow engine 808 may further update local worklists of the users with assigned worklist tasks as included in the new block. For example, with reference to the example where the workflow corresponds to a mortgage application, worklist tasks may be added to local worklists for the users. The first worklist task corresponding to verifying details associated with the mortgage application may be added to a worklist for the first user. The second worklist task corresponding to sending a notification to an external server may be added to a worklist for the notification server. The third worklist task corresponding to approving the mortgage application may be added to a worklist for the second user. The individual worklists may be accessible by the corresponding users via corresponding user computers.

After the block is added to the blockchain, and based on updating the local worklists of the users, worklists tasks associated with the worklist item may be viewed/modified by the user. For example, with reference to an example where the workflow corresponds to a mortgage application, the first user associated may perform the first worklist task assigned to the first user (e.g., verifying the details of the application) and update the worklist task to indicate that verification is complete. For example, a user computing device associated with the first user may send a worklist item, wherein the worklist item may indicate a case ID of the workflow and an activity name associated with the first worklist task. Based on the various steps described above, another block may then be added to the block chain indicating the update to the first worklist task (e.g., indicating completion of the first worklist task). In this manner, updates to the individual worklist tasks may be tracked by the blockchain, from creation to completion. Completion of the first worklist task may initiate processing of the next worklist task in the workflow. For example, a script associated with the second worklist task may be executed based on completion of the worklist task, thereby causing sending of a message to the notification server to which the second worklist task has been assigned. Based on the message, the notification server may send a notification to an external server in accordance with the second worklist task.

Updating local worklists of the users by the workflow engine 808 may comprise indicating whether a worklist task has been completed by a user. For example, a worklist item, sent by a user device via a GUI, may indicate that a worklist task associated with a workflow has been completed. With reference to the example where the workflow corresponds to a mortgage application, when the first user indicates that the first worklist task corresponding to verifying details associated with the mortgage application has been completed by the first user, a worklist item may be sent to the ordering service 804. Based on the various steps described above with reference to FIGS. 8A and 8B, a new block may be created and added to the blockchain indicating completion of the worklist task. The workflow engine 808 may update a local worklist of the first user (and local worklists of other users associated with the workflow) to indicate the completion of the worklist task.

Figure 9:
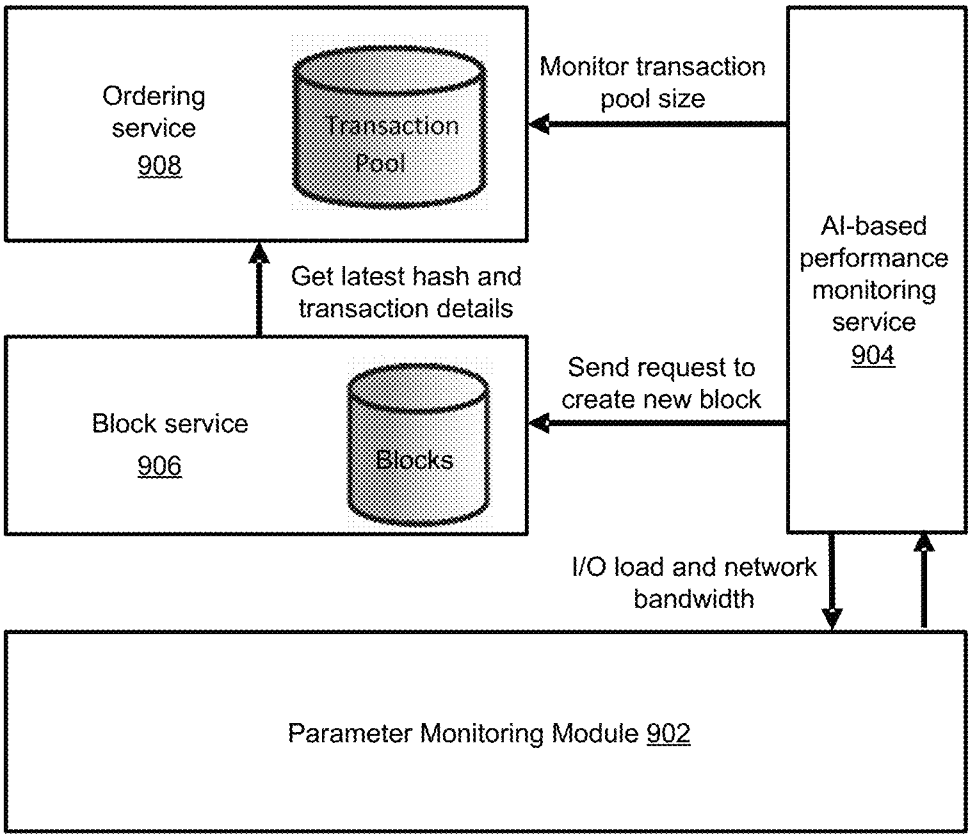
FIG. 9 depicts details related to block generation based on AI-based monitoring of a P2P network in accordance with one or more illustrative aspects described herein.

FIG. 9 shows further details related to block generation based on AI-based monitoring. A parameter monitoring module 902 may monitor various parameters in the decentralized P2P network. For example, the parameter monitoring module 902 may determine various parameters associated with I/O load and network bandwidth of the transaction pool. Based on the parameters, the AI-based performance monitoring service 904 may adjust the number of worklist items in the transaction pool needed to trigger the creation of a new block in the blockchain. In another embodiment, the triggering of the creation of a new block may occur based on the worklist items stored in data store (e.g., transaction pool) satisfying a threshold total size in bytes without regard to the quantity the worklist items. The triggering may, in some examples, cause the sending of a notification to create a new block to a block service 906.

I/O load parameters may comprise one or more of: an average queue size at (e.g., length of) the transaction pool, transaction arrival rate, I/O wait time, read/write speed to the blockchain, number of reads/writes per second to the blockchain, etc. The average length of the transaction pool may correspond to average number of transactions in the transaction pool. The transaction arrival rate may be rate at which transactions are being added to the transaction pool by the ordering service. The I/O wait time may be a wait time for a transaction in the transaction pool prior to being added to a block. The read speed or the write speed may be a bitrate of blocks being read or being written into the blockchain.

Network bandwidth parameters may comprise various network bandwidth statistics of the transaction pool (e.g., average data transfer rate to the transaction pool over a historical time period, packet transfer rate to the transaction pool).

A blockchain bandwidth may be a measure of how fast transactions may be written into a blockchain. A blockchain bandwidth may be defined as a number of transactions per second. The block chain bandwidth may be determined by divided a block size (e.g., number of transactions in a single block) with a block time (e.g., time taken to complete/generate a single block). For example, if a block has 100 transactions and a time taken to generate a block is 4 seconds, the block chain bandwidth is equal to 25 transactions per second. In an arrangement, the AI-based performance monitoring service 904 may adjust a block size based on the I/O load parameters and network bandwidth parameters.

An increased network bandwidth and/or I/O load may indicate that the network is being subject to increased transaction traffic. Based on determination of increased network bandwidth and/or I/O load, the AI-based performance monitoring service 904 may increase the block size such that a larger number of transactions are included in a block and a blockchain bandwidth is increased. For example, based on an increased network bandwidth and/or I/O load, a block size may be increased (e.g., from 100 transactions to 400 transactions). The increase in block size may increase the blockchain bandwidth (e.g., 25 transactions per second to 100 transactions per second) thereby allowing the network to write transactions into the blockchain at a faster rate. On the other hand, a reduced network bandwidth and I/O load may indicate that the network is having reduced transaction traffic. Based on determination of reduced network bandwidth and/or I/O load, the AI-based performance monitoring service 904 may reduce the block size such that a fewer number of transactions are included in a block. Reducing the block size may allow blocks to be generated at a faster rate. This may reduce a time taken for a transaction to be written into the blockchain even though the transaction traffic may have reduced.

The AI-based performance monitoring service 904 may determine whether to increase or decrease a block size based on a threshold value of transaction arrival rate. For example, if a transaction arrival rate is determined to be greater than or equal to a threshold value, a block size may be increased. Increased block size may increase the block chain bandwidth to support the higher transaction arrival rate. Conversely, if the transaction arrival rate is determined to be lower than a threshold, a block size may be reduced. Reduced block size may reduce a wait time for a transaction prior to being written into a block.

As another example, the AI-based performance monitoring service 904 may determine whether to increase or decrease a block size based on a threshold value of an I/O wait time. If an I/O wait time is determined to be greater than a threshold, a block size may be reduced to enable faster block generation. If an I/O wait time is determined to be lower than a threshold, a block size may be increased to allow more transactions to be written into a block.

As another example, the AI-based performance monitoring service 904 may determine whether to increase or decrease a block size based on resource utilization (e.g., processing capacity) in the network. A larger block size may increase processing requirements (e.g., at a user device) for querying past transactions. If resource utilization is determined to be greater than a threshold, a block size may be reduced to enable faster queries of previously generated blocks. If resource utilization is determined to be lower than a threshold, a block size may be increased to enable more transactions to be written into a block (e.g., and increase the blockchain bandwidth).

The parameter monitoring module 902 may track historical network bandwidth and/or I/O load parameters. A reduced network bandwidth may correspond to lower quartile (or any other percentile) of a range of a network bandwidth parameter observed over a historical time period. A reduced I/O load may correspond to lower quartile (or any other percentile) of a range of an I/O load parameter observed over a historical time period. An increased network bandwidth may correspond to an upper quartile (or any other percentile) of a range of a network bandwidth parameter observed over a historical time period. An increased I/O load may correspond to an upper quartile (or any other percentile) of a range of I/O load parameter over a historical time period.

The AI-based performance monitoring service 904 may monitor a transaction pool associated with an ordering service 908 to determine a current size of the transaction pool (e.g., a number of transactions included in the transaction pool). If a size of the transaction pool reaches threshold size, the AI-based performance monitoring service 904 may send a request to a block service 906 to initiate generation of a new block.

The AI-based performance monitoring service 904 may use one or more machine learning algorithms to determine, based on the I/O load parameters and/or network bandwidth parameters, whether to initiate generation of a new block and/or adjust a block size. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

The block service 906 may receive a notification, from the AI-based performance monitoring service 904 and based on one or more of the above considerations, for generating a new block. The block service 906 may determine a hash value of a latest block in the blockchain. Further, the block service 906 may determine transactions included in the transaction pool. Based on the hash value and the transactions items, the block service 906 may generate a new block for addition to the blockchain.

Figure 10:
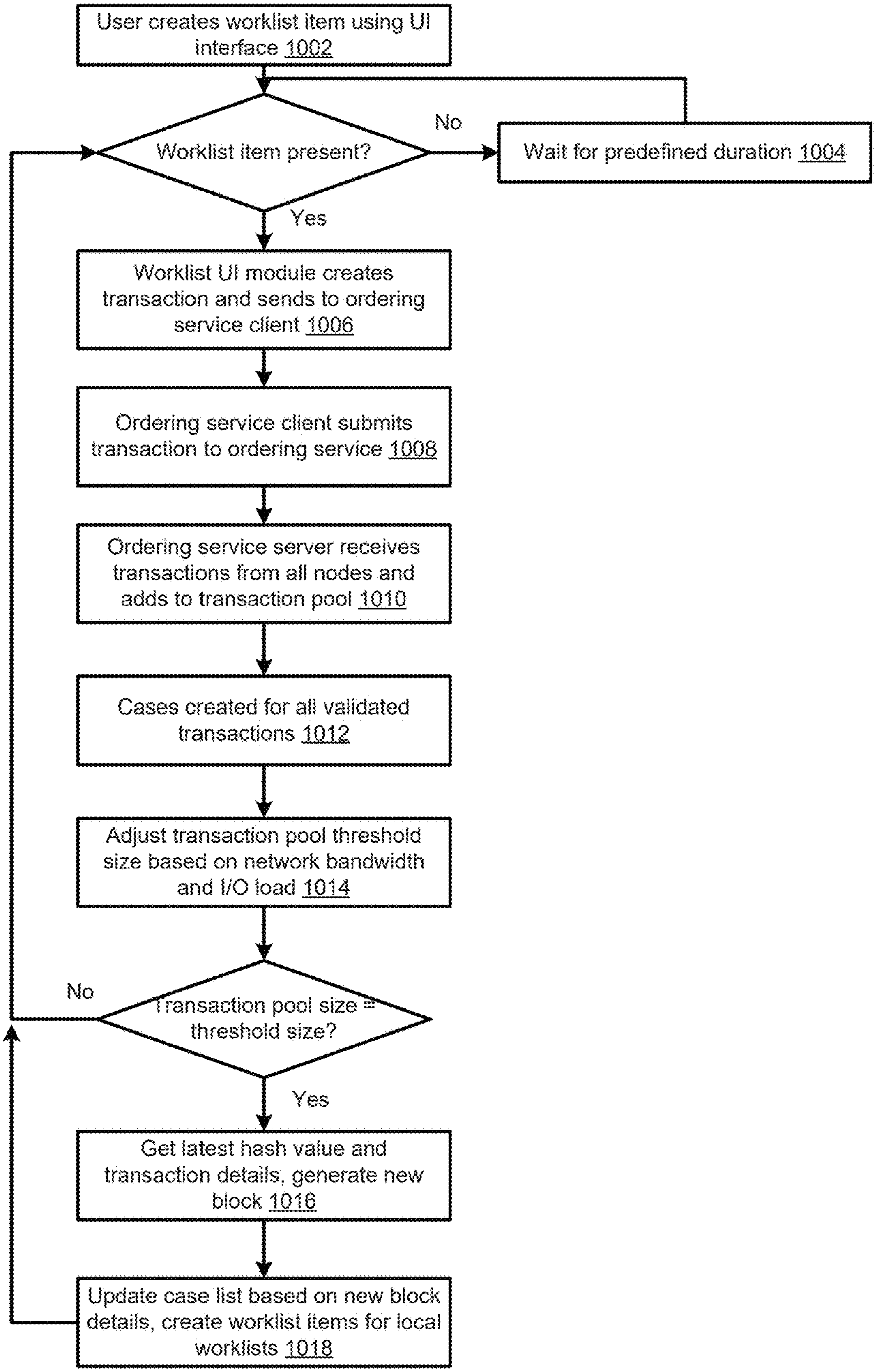
FIG. 10 depicts an example procedure for workflow management using blockchain in accordance with one or more illustrative aspects described herein.

FIG. 10 shows an example procedure for workflow management using blockchain. At step 1002, a user may create a worklist item using a UI at a computing device. At step 1006, a worklist UI module may generate a transaction based on the worklist item and send the transaction to an ordering service client. The worklist UI module may consistently check for any worklist items input via the node and, if no worklist item is detected, wait for a predefined time duration (e.g., step 1004). At step 1008, an ordering service client may submit a transaction to an ordering service. At step 1010, the ordering service server may similarly receive transactions from a plurality of computing devices in the decentralized P2P network and add the transactions to a transaction pool. At step 1012, a workflow engine may create cases for all validated transactions. For example, each case may be assigned a case ID. At step 1012, an AI-based performance monitoring module may adjust a threshold size of the transaction pool (e.g., block size) based on determining one or more network bandwidth parameters and/or I/O load parameters. If the transaction pool size reach the threshold size, the AI-based performance monitoring module may send an instruction to the block service to generate a new block. The block service may determine a latest hash value and transaction details (e.g., associated with the validated transactions), and generate a new block. Based on addition of the new block to the block chain, the workflow engine may create/update local worklists of one or more users/computing devices based on the worklist items corresponding to the validated transactions.

Figure 11:
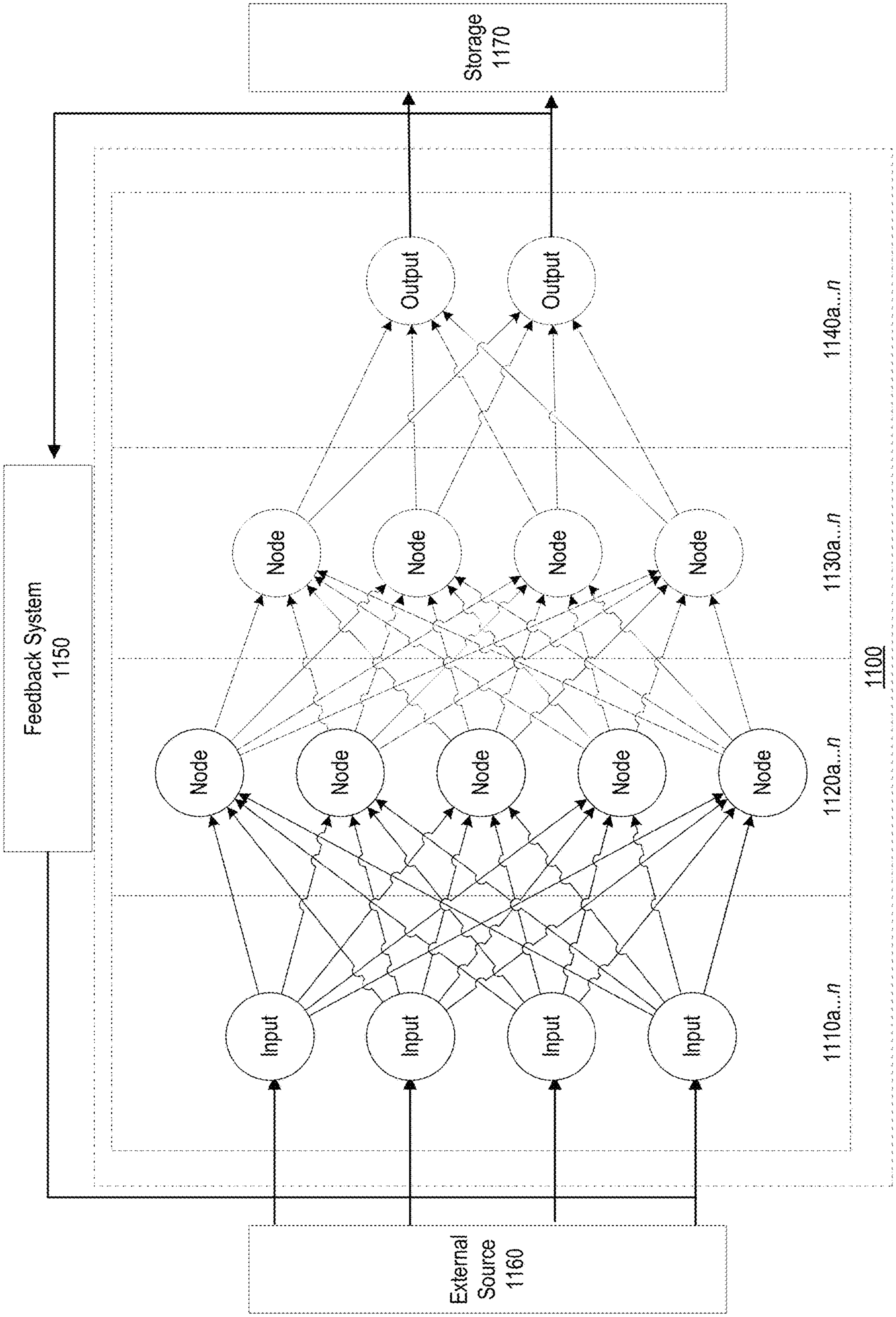
FIG. 11 depicts a simplified example of an artificial neural network on which a machine learning algorithm may be executed in accordance with one or more illustrative aspects described herein.

FIG. 11 illustrates a simplified example of an artificial neural network 1100 on which a machine learning algorithm may be executed. The machine learning algorithm may be used at the AI-based performance monitoring module as described herein. FIG. 11 is merely an example of nonlinear processing using an artificial neural network; other forms of nonlinear processing may be used to implement a machine learning algorithm in accordance with features described herein.

In one example, a framework for a machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which, like neurons, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 1100 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "115% correct").

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

By way of example, in FIG. 11, each of input nodes 1110*a-n* is connected to a first set of processing nodes 1120*a-n*. Each of the first set of processing nodes 1120*a-n* is connected to each of a second set of processing nodes 1130*a-n*. Each of the second set of processing nodes 1130*a-n* is connected to each of output nodes 1140*a-n*. Though only two sets of processing nodes are shown, any number of processing nodes may be implemented. Similarly, though only four input nodes, five processing nodes, and two output nodes per set are shown in FIG. 11, any number of nodes may be implemented per set. Data flows in FIG. 11 are depicted from left to right: data may be input into an input node, may flow through one or more processing nodes, and may be output by an output node. Input into the input nodes 1110*a-n* may originate from an external source 1160. The input from the input nodes may be, for example, one or more of: I/O load parameters, network bandwidth parameters, and/or the like. Output may be sent to a feedback system 1150 and/or to storage 1170. The output from an output node may be a threshold size of the transaction pool and/or a notification for generation of a new block. The feedback system 1150 may send output to the input nodes 1110*a-n* for successive processing iterations with the same or different input data.

In one illustrative method using feedback system 1150, the system may use machine learning to determine an output. The output may include one or more of: determined transfer channel(s), expected wait times, threshold queue lengths, threshold times, predicted expected handshake wait times, threshold customer satisfaction scores, confidence values, operation status of transfer channels, predicted expected usage costs, classification output, and/or the like. The system may use one of a myriad of machine learning models including xg-boosted decision trees, auto-encoders, perceptron, decision trees, support vector machines, regression, and/or a neural network. The neural network may be any of a myriad of type of neural networks including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially.

In one example, FIG. 11 depicts nodes that may perform various types of processing, such as discrete computations, computer programs, and/or mathematical functions implemented by a computing device. For example, the input nodes 1110*a-n* may comprise logical inputs of different data sources, such as one or more data servers. The processing nodes 1120*a-n* may comprise parallel processes executing on multiple servers in a data center. And, the output nodes 1140*a-n* may be the logical outputs that ultimately are stored in results data stores, such as the same or different data servers as for the input nodes 1110*a-n*. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 1100 may learn and/or be dynamically reconfigured. Though nodes are depicted as having connections only to successive nodes in FIG. 11, connections may be formed between any nodes. For example, one processing node may be configured to send output to a previous processing node.

Input received in the input nodes 1110*a-n* may be processed through processing nodes, such as the first set of processing nodes 1120*a-n* and the second set of processing nodes 1130*a-n*. The processing may result in output in output nodes 1140*a-n*. As depicted by the connections from the first set of processing nodes 1120*a-n* and the second set of processing nodes 1130*a-n*, processing may comprise multiple steps or sequences. For example, the first set of processing nodes 1120*a-n* may be a rough data filter, whereas the second set of processing nodes 1130*a-n* may be a more detailed data filter.

The artificial neural network 1100 may be configured to effectuate decision-making. As a simplified example for the purposes of explanation, the artificial neural network 1100 may be configured to detect faces in photographs. The input nodes 1110*a-n* may be provided with a digital copy of a photograph. The first set of processing nodes 1120*a-n* may be each configured to perform specific steps to remove non-facial content, such as large contiguous sections of the color red. The second set of processing nodes 1130*a-n* may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 1100 may then predict the location on the face. The prediction may be correct or incorrect.

The feedback system 1150 may be configured to determine whether or not the artificial neural network 1100 made a correct decision. Feedback may comprise an indication of a correct answer and/or an indication of an incorrect answer and/or a degree of correctness (e.g., a percentage). For example, in the facial recognition example provided above, the feedback system 1150 may be configured to determine if the face was correctly identified and, if so, what percentage of the face was correctly identified. The feedback system 1150 may already know a correct answer, such that the feedback system may train the artificial neural network 1100 by indicating whether it made a correct decision. The feedback system 1150 may comprise human input, such as an administrator telling the artificial neural network 1100 whether it made a correct decision. The feedback system may provide feedback (e.g., an indication of whether the previous output was correct or incorrect) to the artificial neural network 1100 via input nodes 1110*a-n* or may transmit such information to one or more nodes. The feedback system 1150 may additionally or alternatively be coupled to the storage 1170 such that output is stored. The feedback system may not have correct answers at all, but instead base feedback on further processing: for example, the feedback system may comprise a system programmed to identify faces, such that the feedback allows the artificial neural network 1100 to compare its results to that of a manually programmed system.

The artificial neural network 1100 may be dynamically modified to learn and provide better input. Based on, for example, previous input and output and feedback from the feedback system 1150, the artificial neural network 1100 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 1100, such that the artificial neural network 1100 may vary its nodes and connections to test hypotheses.

The artificial neural network 1100 need not have a set number of processing nodes or number of sets of processing nodes, but may increase or decrease its complexity. For example, the artificial neural network 1100 may determine that one or more processing nodes are unnecessary or should be repurposed, and either discard or reconfigure the processing nodes on that basis. As another example, the artificial neural network 1100 may determine that further processing of all or part of the input is required and add additional processing nodes and/or sets of processing nodes on that basis.

The feedback provided by the feedback system 1150 may be mere reinforcement (e.g., providing an indication that output is correct or incorrect, awarding the machine learning algorithm a number of points, or the like) or may be specific (e.g., providing the correct output). For example, the machine learning algorithm 1100 may be asked to detect faces in photographs. Based on an output, the feedback system 1150 may indicate a score (e.g., 115% accuracy, an indication that the guess was accurate, or the like) or a specific response (e.g., specifically identifying where the face was located).

The artificial neural network 1100 may be supported or replaced by other forms of machine learning. For example, one or more of the nodes of artificial neural network 1100 may implement a decision tree, associational rule set, logic programming, regression model, cluster analysis mechanisms, Bayesian network, propositional formulae, generative models, and/or other algorithms or forms of decision-making. The artificial neural network 1100 may effectuate deep learning.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A method for dynamic new block creation in a blockchain, the method comprising:

- receiving, at a workflow engine and from a user computing device comprising a graphical user interface module, a first worklist item;
- validating, at the workflow engine, the first worklist item;
- adding the first worklist item to a data store communicatively coupled with a plurality of user computing devices, wherein the data store comprises a plurality of worklist items comprising the first worklist item;
- creating a block, wherein creating the block comprises:
  - determining a threshold size for block creation, wherein the determining the threshold size comprises:
    - determining a resource utilization, at one or more user computing devices, for querying transactions associated with historical worklist items as stored in previous blocks of the blockchain,
    - monitoring an input and output (I/O) load of the data store,
    - monitoring a network bandwidth corresponding to the data store,
    - based on the resource utilization being greater than a threshold value, the threshold size is decreased, and
    - based on the I/O load being high and the network bandwidth being high, the threshold size is increased;
  - comparing, by a computer processor, a size of the plurality of worklist items to the threshold size;

determining, by the computer processor, that the size meets the threshold size;

in response to the determining that the size meets the threshold size, generating a hash value corresponding to the plurality of worklist items in the data store; and creating the block using the generated hash value and an immediately preceding block hash in the blockchain;

transmitting the block for addition to the blockchain; and updating the workflow engine with the blockchain, wherein the workflow engine comprises activity names and identifiers corresponding to the plurality of worklist items.

2. The method of claim 1, wherein a high network bandwidth comprises values in an upper quartile of a range of network bandwidths over a historical time period.

3. The method of claim 1, wherein a high I/O load comprises values in a higher quartile of a range of I/O loads over a historical time period.

4. The method of claim 1, wherein the monitoring the I/O load of the data store comprises monitoring at least one of:

an average size of the data store;

an arrival rate of worklist items to the data store;

an average wait time for a worklist item in the data store; and combinations thereof.

5. The method of claim 1, wherein the monitoring the network bandwidth of the data store comprises monitoring at least one of:

an average data transfer rate to the data store;

an average packet transfer rate to the data store; and combination thereof.

6. The method of claim 1, further comprising:

increasing the threshold size when the I/O load is high.

7. The method of claim 1, further comprising decreasing the threshold size when the I/O load is low, wherein a low I/O load comprises values in a lower quartile of a range of I/O loads over a historical time period.

8. The method of claim 1, further comprising:

decreasing the threshold size when the network bandwidth is low.

9. The method of claim 8, wherein a low network bandwidth comprises values in a lower quartile of a range of network bandwidths over a historical time period.

10. The method of claim 1, further comprising allocating an award to a first blockchain node, of a plurality of blockchain nodes associated with the plurality of user computing devices, in response to adding of the block to the blockchain.

11. The method of claim 1, wherein the creating the block comprises adding a time stamp to the block, wherein the time stamp indicates a time of creation of the block.

12. The method of claim 1, wherein the first worklist item comprises:

an indication of the user computing device; and one or more worklist tasks associated with a workflow.

13. The method of claim 1, wherein the first worklist item comprises updated information associated with a worklist task stored in a previous block of the blockchain.

14. The method of claim 1, wherein the validating the first worklist item comprises determining whether the user computing device is authorized to send the first worklist item.

15. A system comprising:

a user computing device comprising a graphical user interface (GUI) module configured to receive an input indicating first worklist item;

an ordering service server communicatively coupled to a plurality of user computing devices comprising the user computing device, wherein the ordering service server is configured to:

receive, from the user computing device, the first worklist item; and add the first worklist item to a data store, wherein the data store comprises a plurality of worklist items comprising the first worklist item;

a computer processor configured to:

create a block, wherein creating the block comprises:

determining a threshold size for block creation, wherein the determining the threshold size comprises:

determining a resource utilization, at one or more user computing devices, for querying transactions associated with historical worklist items as stored in previous blocks of a blockchain, monitoring an input and output (I/O) load of the data store, monitoring a network bandwidth corresponding to the data store, based on the resource utilization being greater than a threshold value, the threshold size is decreased, and based on the I/O load being high and the network bandwidth being high, the threshold size is increased;

comparing a size of the plurality of worklist items to the threshold size for block creation;

determining that the size meets the threshold size;

in response to the determining that the size meets the threshold size, generating a hash value corresponding to the plurality of worklist items in the data store; and creating the block using the generated hash value and an immediately preceding block hash in the blockchain; and transmit the block for addition to the blockchain; and a workflow engine configured to:

receive, from the ordering service server, the first worklist item;

validate the first worklist item; and update, based on the block, worklists associated with the plurality of user computing devices.

16. The system of claim 15, wherein a high network bandwidth comprises values in an upper quartile of a range of network bandwidths over a historical time period.

17. The system of claim 15, wherein a high I/O load comprises values in a higher quartile of a range of I/O loads over a historical time period.

18. A non-transitory computer-readable medium storing computer-executable instructions that, when executed by one or more computer processors, cause a blockchain computer system to:

receive, from a user computing device comprising a graphical user interface module, a first worklist item;

validate the first worklist item;

add the first worklist item to a data store communicatively coupled with a plurality of user computing devices, wherein the data store comprises a plurality of worklist items comprising the first worklist item;

create a block, wherein creating the block comprises:

determining a threshold size for block creation, wherein the determining the threshold size comprises:

determining a resource utilization, at one or more user computing devices, for querying transactions associated with historical worklist items as stored in previous blocks of a blockchain, monitoring an input and output (I/O) load of the data store, monitoring a network bandwidth corresponding to the data store, based on the resource utilization being greater than a threshold value, the threshold size is decreased, and based on the I/O load being high and the network bandwidth being high, the threshold size is increased;

comparing a size of the plurality of worklist items to the threshold size;

determining that the size meets the threshold size;

in response to the determining that the size meets the threshold size, generating a hash value corresponding to the plurality of worklist items in the data store; and creating the block using the generated hash value and an immediately preceding block hash in the blockchain; and transmit the block for addition to the blockchain.

* * * * *